United States Patent
Yanai et al.

(10) Patent No.: US 8,361,344 B2
(45) Date of Patent: Jan. 29, 2013

(54) LIQUID CRYSTAL COMPOSITION AND LIQUID CRYSTAL DISPLAY DEVICE

(75) Inventors: Takayoshi Yanai, Ichihara (JP); Masayuki Saito, Ichihara (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 233 days.

(21) Appl. No.: 12/856,396

(22) Filed: Aug. 13, 2010

(65) Prior Publication Data
US 2011/0097519 A1   Apr. 28, 2011

(30) Foreign Application Priority Data

Oct. 26, 2009   (JP) .................................. 2009-245392

(51) Int. Cl.
*C09K 19/06* (2006.01)
*C09K 19/12* (2006.01)
*C09K 19/20* (2006.01)
*C09K 19/32* (2006.01)
*C09K 19/34* (2006.01)

(52) U.S. Cl. ........... 252/299.6; 252/299.01; 252/299.61; 252/299.62; 252/299.63; 252/299.66; 252/299.67; 428/1.1; 428/1.2; 428/1.3

(58) Field of Classification Search .................. 428/1.1, 428/1.2, 1.3; 252/299.01, 299.6, 299.61, 252/299.62, 299.63, 299.66, 299.67
See application file for complete search history.

(56) References Cited

U.S. PATENT DOCUMENTS

| 8,124,197 B2 * | 2/2012 | Saito et al. ..................... 428/1.1 |
| 2009/0278089 A1 | 11/2009 | Saito et al. ............... 252/299.63 |

FOREIGN PATENT DOCUMENTS

| JP | 2007-002132 | 1/2007 |
| JP | 2009-270026 | 11/2009 |

* cited by examiner

*Primary Examiner* — Geraldina Visconti
(74) *Attorney, Agent, or Firm* — Hogan Lovells US LLP

(57) ABSTRACT

The subject is to provide a liquid crystal composition that satisfies at least one of characteristics such as a high maximum temperature of the nematic phase, a low minimum temperature of the nematic phase, a small viscosity, a suitable optical anisotropy, a large negative dielectric anisotropy, a large specific resistance, a high stability to ultraviolet light and a high stability to heat, or that is suitably balanced regarding at least two of the characteristics. The subject is also to provide the AM device that has a short response time, a large voltage holding ratio, a large contrast ratio, a long service life, and so forth. The invention provides a liquid crystal composition having a negatively dielectric anisotropy containing a specific compound having a negatively large dielectric anisotropy as a first component, and a specific compound having a negatively large dielectric anisotropy as a second component, and provides a liquid crystal display device containing this composition.

16 Claims, No Drawings

LIQUID CRYSTAL COMPOSITION AND LIQUID CRYSTAL DISPLAY DEVICE

BACKGROUND OF THE INVENTION

1. Field of the Invention

The invention relates mainly to a liquid crystal composition suitable for use in an AM (active matrix) device, and an AM device containing the composition. More specifically, the invention relates to a liquid crystal composition having a negative dielectric anisotropy, and a device that contains the composition, having a mode such as IPS (in-plane switching), VA (vertical alignment) or PSA (Polymer sustained alignment) mode.

2. Related Art

In a liquid crystal display device, a classification based on an operating mode for liquid crystals includes phase change (PC), twisted nematic (TN), super twisted nematic (STN), electrically controlled birefringence (ECB), optically compensated bend (OCB), in-plane switching (IPS), vertical alignment (VA) and polymer sustained alignment (PSA). A classification based on a driving mode in the device includes a passive matrix (PM) and an active matrix (AM). The PM is further classified into static, multiplex and so forth, and the AM is classified into a thin film transistor (TFT), a metal-insulator-metal (MIM) and so forth. The TFT is further classified into amorphous silicon and polycrystal silicon. The latter is classified into a high temperature type and a low temperature type according to the production process. A classification based on a light source includes a reflection type utilizing natural light, a transmission type utilizing a backlight and a semi-transmission type utilizing both natural light and a backlight.

These devices contain a liquid crystal composition having suitable characteristics. The liquid crystal composition has a nematic phase. General characteristics of the composition should be improved to provide an AM device having good general characteristics. Table 1 below summarizes the relationship between the general characteristics of the two. The general characteristics of the composition will be further explained based on a commercially available AM device. The temperature range of the nematic phase relates to the temperature range in which the device can be used. A desirable maximum temperature of the nematic phase is approximately 70° C. or higher and a desirable minimum temperature of the nematic phase is approximately −10° C. or lower. The viscosity of the composition relates to the response time of the device. A short response time is desirable to display moving images on the device. Accordingly, a small viscosity of the composition is desirable. A small viscosity at a low temperature is more desirable.

TABLE 1

General Characteristics of a Liquid Crystal Composition and an AM Device

| General Characteristics of a Composition | General Characteristics of an AM Device |
| --- | --- |
| Temperature range of a nematic phase is wide | Usable temperature range is wide |
| Viscosity is small [1] | Response time is short |
| Optical anisotropy is suitable | Contrast ratio is large |
| Dielectric anisotropy is positively or negatively large | Threshold voltage is low and electric power consumption is small Contrast ratio is large |
| Specific resistance is large | Voltage holding ratio is large and a contrast ratio is large |
| Stable to ultraviolet light and heat | Service life is long |

[1] A liquid crystal composition can be injected into a liquid crystal cell in a shorter period of time.

The optical anisotropy of the composition relates to the contrast ratio of the device. The product ($\Delta n \times d$) of the optical anisotropy ($\Delta n$) of the composition and the cell gap (d) of the device is designed so as to maximize the contrast ratio. A suitable value of the product depends on the kinds of operating modes. In a device having a VA mode, a suitable value is in the range of approximately 0.30 μm to approximately 0.40 μm. In a device having an IPS mode, a suitable value is in the range of approximately 0.20 μm to approximately 0.30 μm. In this case, a composition having a large optical anisotropy is desirable for a device having a small cell gap. A large dielectric anisotropy in the composition contributes to a low threshold voltage, a small electric power consumption and a large contrast ratio of the device. Accordingly, the large dielectric anisotropy is desirable. A large specific resistance of the composition contributes to a large voltage holding ratio and a large contrast ratio of the device. Accordingly, a composition having a large specific resistance is desirable at room temperature and also at a high temperature in the initial stage. A composition having a large specific resistance is desirable at room temperature and also at a high temperature after it has been used for a long time. The stability of the composition to ultraviolet light and heat relates to the service life of the liquid crystal display device. When the stability is high, the device has a long service life. These characteristics are desirable for an AM device used in a liquid crystal projector, a liquid crystal television and so forth.

A composition having a positive dielectric anisotropy is used for an AM device having a TN mode. On the other hand, a composition having a negative dielectric anisotropy is used for an AM device having a VA mode. A composition having a positive or negative dielectric anisotropy is used for an AM device having an IPS mode. A composition having a positive or negative dielectric anisotropy is used for an AM device having a PSA mode. Examples of the liquid crystal composition having a negative dielectric anisotropy are disclosed in the following patent documents.

Conventional compositions are disclosed in the patent document No. 1: JP 2007-2132A (2007).

A desirable AM device has characteristics such as a wide temperature range in which the device can be used, a short response time, a large contrast ratio, a low threshold voltage, a large voltage holding ratio and a long service life. A shorter response time even if it is only 1 millisecond is desirable. Thus, desirable characteristics of the composition are a high maximum temperature of the nematic phase, a low minimum temperature of the nematic phase, a small viscosity, a suitable optical anisotropy, a positively or negatively large dielectric anisotropy, a large specific resistance, a high stability to ultraviolet light, a high stability to heat, and so forth.

SUMMARY OF THE INVENTION

One of the advantages of the invention is to provide a liquid crystal composition that satisfies at least one of characteristics such as a high maximum temperature of a nematic phase, a low minimum temperature of a nematic phase, a small viscosity, a large optical anisotropy, a large negative dielectric anisotropy, a large specific resistance, a high stability to ultraviolet light, a high stability to heat. Another advantage of the invention is to provide a liquid crystal composition that is suitably balanced regarding at least two of the characteristics. A further advantage of the invention is to provide a liquid crystal display device that contains the liquid crystal composition. An additional advantage of the invention is to provide a liquid crystal composition that has a large optical anisotropy, a large dielectric anisotropy, a high stability to ultraviolet light and so forth, and is to provide an AM device that has a short response time, a large voltage holding ratio, a large contrast ratio, a long service life, and so forth.

The invention concerns a liquid crystal composition having the nematic phase and containing two components, wherein the first component is at least one optically active compound selected from the group of compounds represented by formula (1) and the second component is at least one compound selected from the group of compounds represented by formula (2), and concerns also a liquid crystal display device containing the composition:

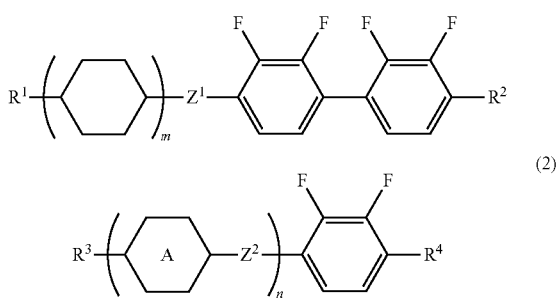

wherein $R^1$, $R^2$, $R^3$ and $R^4$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring A is independently 1,4-cyclohexylene or 1,4-phenylene in which arbitrary hydrogen is replaced by fluorine or chlorine, or tetrahydropyran-2,5-diyl; at least one of ring A is tetrahydropyran-2,5-diyl; $Z^1$ is independently methyleneoxy or carbonyloxy; $Z^2$ is independently a single bond, ethylene, methyleneoxy or carbonyloxy; m is 1 or 2; n is 1, 2 or 3.

DETAILED DESCRIPTION OF THE INVENTION

The advantages of the invention is to provide a liquid crystal composition that satisfies at least one of characteristics such as a high maximum temperature of a nematic phase, a low minimum temperature of a nematic phase, a small viscosity, a large optical anisotropy, a large negative dielectric anisotropy, a large specific resistance, a high stability to ultraviolet light, a high stability to heat. Another advantage of the invention is to provide a liquid crystal composition that is suitably balanced regarding at least two of the characteristics. One of aspects of the invention is to provide a liquid crystal display device that contains the liquid crystal composition. Another aspect of the invention is to provide a liquid crystal composition that has a large optical anisotropy, a large negative dielectric anisotropy, a high stability to ultraviolet light and so forth, and is to provide an AM device that has a short response time, a large voltage holding ratio, a large contrast ratio, a long service life, and so forth.

The terms used in this specification and claims are defined as follows. The liquid crystal composition and the liquid crystal display device of the invention may occasionally be abbreviated to "the composition" and "the device," respectively. A liquid crystal display device is a generic term for a liquid crystal display panel and a liquid crystal display module. The "liquid crystal compound" is a generic term for a compound having a liquid crystal phase such as a nematic phase and a smectic phase, and also for a compound having no liquid crystal phases but being useful as a component of a composition. The useful compound has a six-membered ring such as 1,4-cyclohexylene and 1,4-phenylene, and has a rod-like molecular structure. An optically active compound or a polymerizable compound may occasionally be added to the composition. Even in the case where these compounds are liquid crystal compounds, the compounds are classified as an additive herein. At least one compound selected from the group of compounds represented by formula (1) may occasionally be abbreviated to "the compound (1)" "The compound (1)" means one compound, or two or more compounds represented by formula (1). The same rules apply to compounds represented by the other formulas. "Arbitrary" is used not only in cases when the position is rbitrary but also in cases when the number is arbitrary. However, it is not used in cases when the number is 0 (zero).

A higher limit of the temperature range of a nematic phase may occasionally be abbreviated to "the maximum temperature." A lower limit of the temperature range of a nematic phase may occasionally be abbreviated to "the minimum temperature." That "a specific resistance is large" means that a composition has a large specific resistance at room temperature and also at a temperature close to the maximum temperature of the nematic phase in the initial stage, and that the composition has a large specific resistance at room temperature and also at a temperature close to the maximum temperature of the nematic phase even after it has been used for a long time. That "a voltage holding ratio is large" means that a device has a large voltage holding ratio at room temperature and also at a temperature close to the maximum temperature of the nematic phase in the initial stage, and that the device has a large voltage holding ratio at room temperature and also at a temperature close to the maximum temperature of the nematic phase even after it has been used for a long time. When characteristics such as optical anisotropy are explained, values obtained according to the measuring methods described in Examples will be used. A first component means one compound, or two or more compounds. "A ratio of the first component" means the percentage by weight (% by weight) of the first component based on the total weight of the liquid crystal composition. The same rule applies to a ratio of the second component and so forth. A ratio of an additive mixed into a composition means the percentage by weight (% by weight) or weight parts per million (ppm) based on the total weight of the liquid crystal composition.

The symbol $R^1$ is used for a plurality of compounds in the chemical formulas of component compounds. The meanings of two arbitrary $R^1$ may be the same or different in these compounds. In one case, for example, $R^1$ of the compound (1-1) is ethyl and $R^1$ of the compound (1-2) is ethyl. In another case, $R^1$ of the compound (1-1) is ethyl and $R^1$ of the compound (1-2) is propyl. The same rule applies to the symbol $R^2$, $X^1$ and so forth.

The invention includes the following items.
Item 1. A liquid crystal composition having a negatively dielectric anisotropy containing at least one compound selected from the group of compounds represented by formula (1) as the first component, and at least one compound selected from the group of compounds represented by formula (2) as the second component:

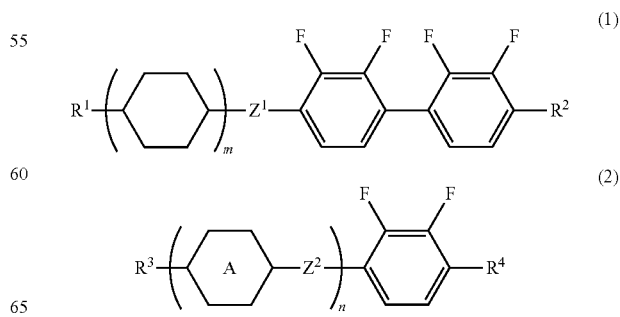

wherein $R^1$, $R^2$, $R^3$ and $R^4$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring A is independently 1,4-cyclohexylene or 1,4-phenylene in which arbitrary hydrogen is replaced by fluorine or chlorine, or tetrahydropyran-2,5-diyl; at least one ring A is tetrahydropyran-2,5-diyl; $Z^1$ is independently methyleneoxy or carbonyloxy; $Z^2$ is independently a single bond, ethylene, methyleneoxy or carbonyloxy; m is 1 or 2; n is 1, 2 or 3.

Item 2. The liquid crystal composition according to item 1, wherein the first component is at least one compound selected from the group of compounds represented by formula (1-1) to formula (1-4):

(1-1)

(1-2)

(1-3)

(1-4)

wherein $R^1$ and $R^2$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

Item 3. The liquid crystal composition according to item 2, wherein the first component is at least one compound selected from the group of compounds represented by formula (1-2):

Item 4. The liquid crystal composition according to any one of items 1 to 3, wherein the second component is at least one compound selected from the group of compounds represented by formula (2-1) to (2-4):

(2-1)

(2-2)

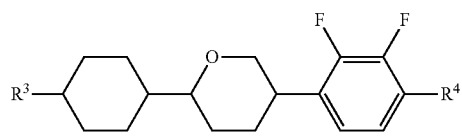
(2-3)

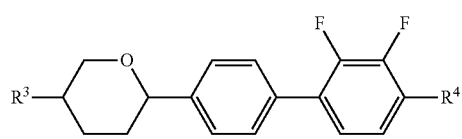
(2-4)

wherein $R^3$ and $R^4$ are alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

Item 5. The liquid crystal composition according to item 4, wherein the second component is at least one compound selected from the group of compounds represented by formula (2-3).

Item 6. The liquid crystal composition according to any one of items 1 to 5, wherein the ratio of the first component is in the range of approximately 5% by weight to approximately 60% by weight, and the ratio of the second component is in the range of approximately 5% by weight to approximately 40% by weight based on the total weight of the liquid crystal composition.

Item 7. The liquid crystal composition according to any one of items 1 to 6, wherein the third component contains at least one compound selected from the group of compounds represented by formula (3):

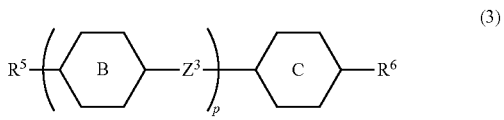
(3)

wherein $R^5$ and $R^6$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring B and ring C are each independently 1,4-cyclohexylene, 1,4-phenylene, 2-fluoro-1,4-phenylene, or 3-fluoro-1,4-phenylene; $Z^3$ is independently a single bond, ethylene, methyleneoxy or carbonyloxy; and p is 1, 2 or 3.

Item 8. The liquid crystal composition according to item 7, wherein the third component is at least one compound selected from the group of compounds represented by formula (3-1) to formula (3-13):

(3-1)

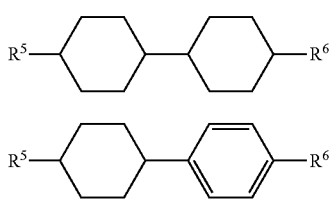
(3-2)

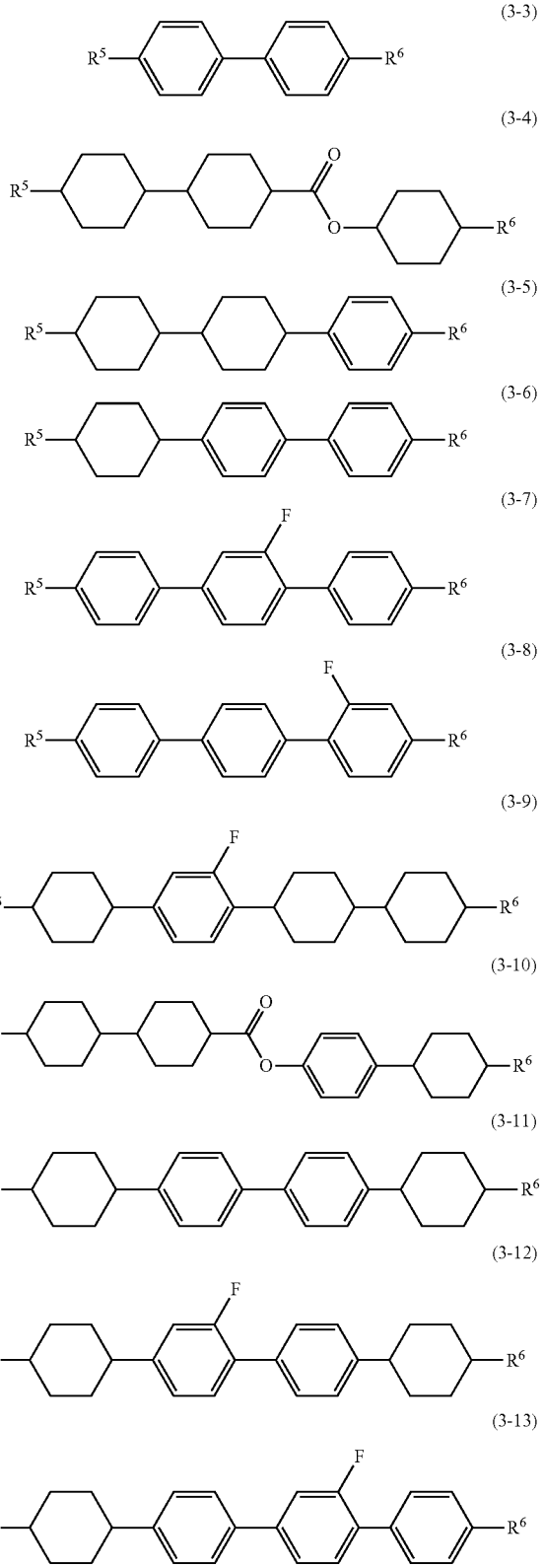

wherein $R^5$ and $R^6$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

Item 9. The liquid crystal composition according to item 8, wherein the third component is at least one compound selected from the group of compounds represented by formula (3-1):

Item 10. The liquid crystal composition according to item 8, wherein the third component is a mixture of at least one compound selected from the group of compounds represented by formula (3-1) and at least one compound selected from the group of compounds represented by formula (3-5).

Item 11. The liquid crystal composition according to item 8, wherein the third component is a mixture of at least one compound, selected from the group of compounds represented by formula (3-1) and at least one compound selected from the group of compounds represented by formula (3-8).

Item 12. The liquid crystal composition according to item 8, wherein the third component is a mixture of at least one compound selected from the group of compounds represented by formula (3-1), and at least one compound selected from the group of compounds represented by formula (3-5), and at least one compound selected from the group of compounds represented by formula (3-8).

Item 13. The liquid crystal composition according to any one of items 7 to 12, wherein the ratio of the third component is in the range of approximately 30% to approximately 75% by weight based on the total weight of the liquid crystal composition.

Item 14. The liquid crystal composition according to any one of items 1 to 13, wherein the fourth component further contains at least one compound selected from the group of compounds represented by formula (4-1) to formula (4-2):

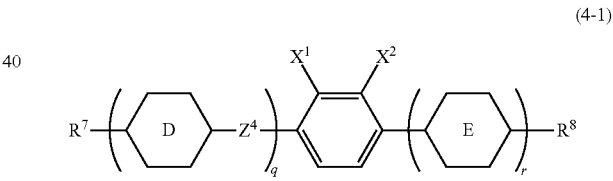

wherein $R^7$, $R^8$, $R^9$ and $R^{10}$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring D, ring E and ring F are each independently 1,4-cyclohexylene or 1,4-phenylene; $Z^4$ and $Z^5$ are each independently a single bond, ethylene, methyleneoxy or carbonyloxy; $X^1$ and $X^2$ are each independently fluorine or chlorine; and q and r are each independently 0, 1, 2 or 3, the sum of q and r is 3 or less; s is 1, 2 or 3.

Item 15. The liquid crystal composition according to item 14, wherein the fourth component is at least one compound selected from the group of compounds represented by formula (4-1-1) to (4-1-12) and (4-2-1) to (4-2-5):

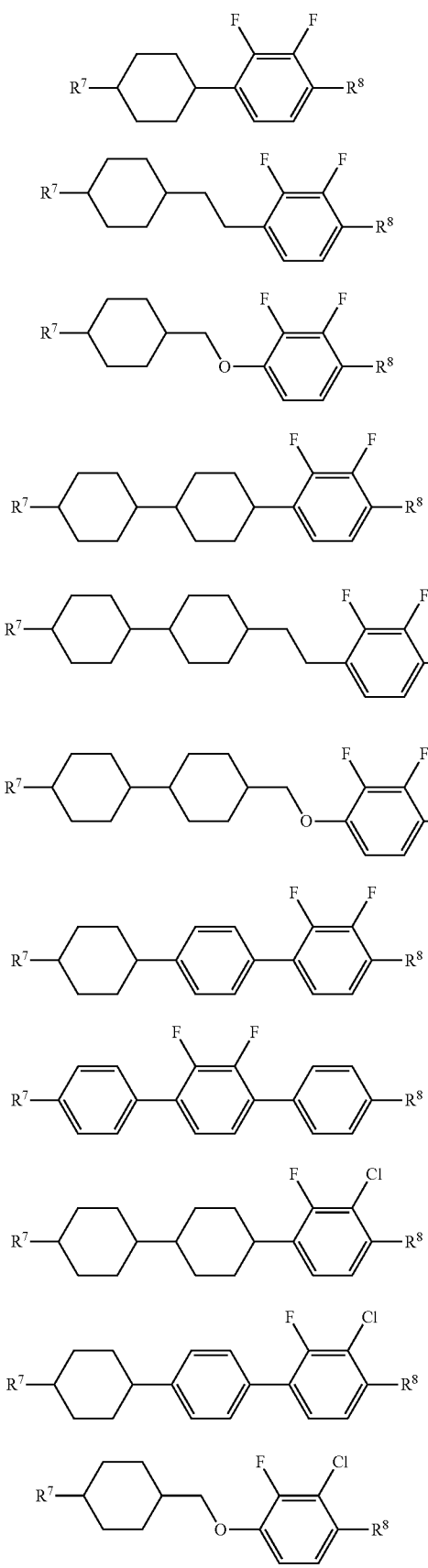
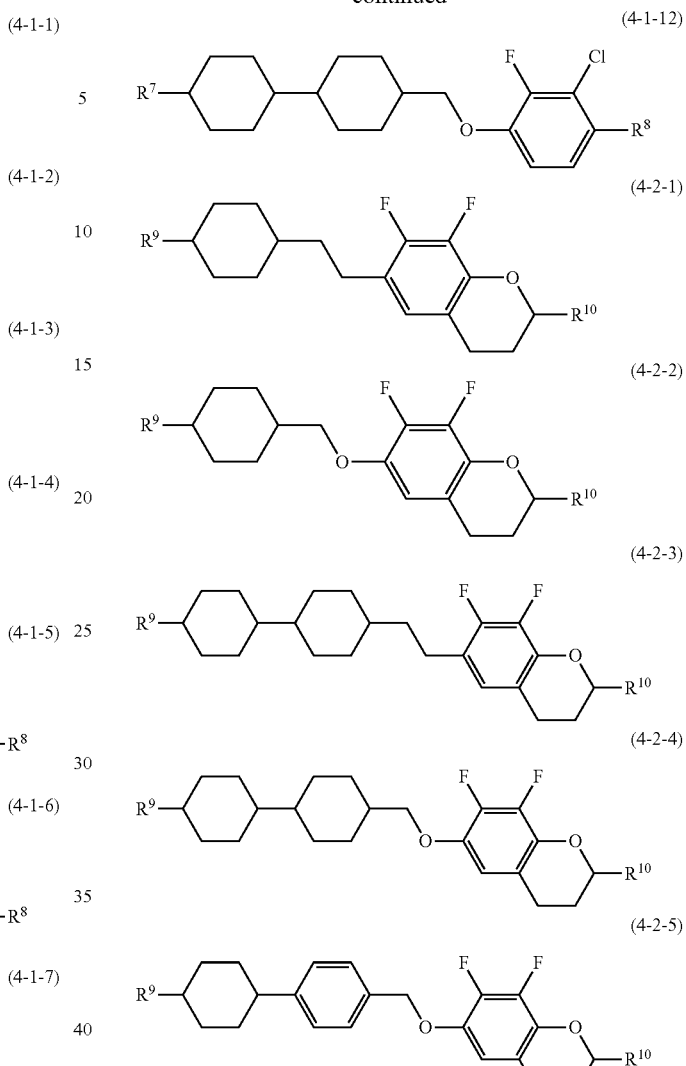

Item 16. The liquid crystal composition according to item 15, wherein the fourth component is at least one compound selected from the group of compounds represented by formula (4-1-1).

Item 17. The liquid crystal composition according to item 15, wherein the fourth component is at least one compound selected from the group of compounds represented by formula (4-1-9).

Item 18. The liquid crystal composition according to item 15, wherein the fourth component is a mixture of at least one compound selected from the group of the compounds represented by formula (4-1-1) and at least one compound selected from the group of compounds represented by formula (4-1-4).

Item 19. The liquid crystal composition according to item 15, wherein the fourth component is a mixture of at least one compound selected from the group of the compounds represented by formula (4-1-1) and at least one compound selected from the group of compounds represented by formula (4-1-7).

Item 20. The liquid crystal composition according to item 15, wherein the fourth component is a mixture of at least one compound selected from the group of the compounds represented by formula (4-1-1), at least one compound selected from the group of the compounds represented by formula (4-1-4) and at least one compound selected from the group of compounds represented by formula (4-1-7).

Item 21. The liquid crystal composition according to any one of items 14 to 20, wherein the ratio of the fourth component is in the range of approximately 15% to approximately 50% by weight based on the total weight of the liquid crystal composition.

Item 22. The liquid crystal composition according to any one of items 1 to 21, wherein the maximum temperature of the nematic phase is approximately 70° C. or higher, the optical anisotropy (25° C.) at a wavelength of 589 nm is approximately 0.08 or more, and the dielectric anisotropy (25° C.) at a frequency of 1 kHz is approximately −2 or less.

Item 23. A liquid crystal display device containing the liquid crystal composition according to any one of items 1 to 22.

Item 24. The liquid crystal display device according to item 23, wherein an operating mode of the liquid crystal display device is a VA mode, an IPS mode or a PSA mode, and a driving mode of the liquid crystal display device is an active matrix mode.

The invention further includes the following items: (1) the composition described above that further includes an optically active compound; (2) the composition described above that further includes an additive, such as an antioxidant, an ultraviolet light absorbent, an antifoaming agent; (3) an AM device that includes the composition described above; (4) a device having a mode of TN, ECB, OCB, IPS, VA or PSA and containing the composition described above; (5) a device having a transmission type and containing the composition described above; (6) use of the composition described above as a composition having the nematic phase; and (7) use of the composition described above as an optically active composition by adding an optically active compound into the composition described above.

The composition of the invention will be explained in the following order. First, the constitution of component compounds in the composition will be explained. Second, main characteristics of the component compounds and main effects of the compounds on the composition will be explained. Third, a combination of components in the composition, desirable ratios of the component compounds and the basis thereof will be explained. Fourth, a desirable embodiment of the component compounds will be explained. Fifth, examples of the component compound will be shown. Sixth, additives that may be mixed into the composition will be explained. Seventh, methods for synthesizing the component compounds will be explained. Last, use of the composition will be explained.

First, the constitution of component compounds in the composition will be explained. The composition of the invention is classified into the composition A and the composition B. The composition A may further include other liquid crystal compounds, an additive, an impurity and so forth. "The other liquid crystal compounds" are different from the compound (1), the compound (2), the compound (3), the compound (4-1) and the compound (4-2). Such compounds are mixed into the composition for the purpose of further adjusting characteristics of the composition. Of the other liquid crystal compounds, a smaller amount of a cyano compound is more desirable in view of its stability to heat or ultraviolet light. A more desirable ratio of the cyano compound is approximately 0% by weight. The additive includes an optically active compound other than the first component, an antioxidant, an ultraviolet light absorbent, a coloring matter, an antifoaming agent, a polymerizable compound and a polymerization initiator. The impurity is a compound and so forth contaminated in a process such as the synthesis of component compounds. Even in the case where the compound is a liquid crystal compound, it is classified as an impurity herein.

The composition B is essentially consisting of compounds selected from the group of the compound (1), the compound (2), the compound (3), the compound (4-1) and the compound (4-2). The term "essentially" means that the composition may include an additive and an impurity, but does not include other liquid crystal compounds which are different from these compounds. The composition B has a smaller number of components than the composition A. The composition B is preferable to the composition A in view of cost reduction. The composition A is preferable to the composition B in view of the fact that characteristics can be further adjusted by mixing the other liquid crystal compounds.

Second, main characteristics of the component compounds and main effects of the compounds on the composition will be explained. The main characteristics of the component compounds are summarized in Table 2 on the basis of the effects of the invention. In Table 2, the symbol L stands for "large" or "high", the symbol M stands for "medium", and the symbol S stands for "small" or "low." The symbols L, M and S are classification based on a qualitative comparison among the component compounds, and 0 (zero) means that "the value is nearly zero."

TABLE 2

| Characteristics of Compounds | | | | |
|---|---|---|---|---|
| Compounds | Compound (1) | Compound (2) | Compound (3) | Compound (4-1) Compound (4-2) |
| Maximum temperature | M-L | S-M | S-L | S-M |
| Viscosity | L | M | S-M | M-L |
| Optical Anisotropy | M | M-L | S-L | M-L |
| Dielectric Anisotropy | L [1] | L [1] | 0 | L [1] |
| Specific Resistance | L | L | L | L |

[1] The values of dielectric anisotropy are negative and the symbols show relative magnitude of absolute values.

Main effects of the component compounds on the characteristics of the composition upon mixing the component compounds to the composition are as follows. The compound (1) increases the maximum temperature and the absolute value of dielectric anisotropy. The compound (2) decreases the minimum temperature and increases the dielectric anisotropy. The compound (3) increases the maximum temperature or decreases the viscosity. The compounds (4-1) and (4-2) increase the absolute value of dielectric anisotropy.

Third, a combination of components in the composition, desirable ratios of the component compounds and the basis thereof will be explained. The combination of the components in the composition is the first and second components, the first, second and third components, the first, second and fourth components, and the first, second, third and fourth components. A desirable combination is the first, second, third and fourth components.

A desirable ratio of the first component is approximately 5% by weight or more for increasing the absolute value of dielectric anisotropy, and is approximately 60% by weight or less for decreasing the minimum temperature. A more desirable ratio is in the range of approximately 5% to approximately 50% by weight. An especially desirable ratio is in the range of approximately 5% by weight to approximately 40% by weight based on the total weight of liquid crystal composition.

A desirable ratio of the second component is approximately 5% by weight or more for increasing the absolute value of dielectric anisotropy, and is approximately 40% by weight or less for decreasing the minimum temperature. A more desirable ratio is in the range of approximately 5% to approximately 30% by weight. An especially desirable ratio is in the range of approximately 5% to approximately 20% by weight based on the total weight of liquid crystal composition.

A desirable ratio of the third component is approximately 30% by weight or more for increasing the maximum temperature or for decreasing the viscosity, and is 75% by weight or less for increasing the absolute value of dielectric anisotropy. A more desirable ratio is in the range of approximately 35% to approximately 70% by weight. An especially desirable ratio is in the range of approximately 40% to approximately 65% by weight based on the total weight of liquid crystal composition.

A desirable ratio of the fourth component is approximately 15% by weight or more for increasing the dielectric anisotropy, and is approximately 50% by weight or less for decreasing the viscosity. A more desirable ratio is in the range of approximately 20% to approximately 45% by weight. An especially desirable ratio is in the range of approximately 25% to approximately 40% by weight based on the total weight of liquid crystal composition.

Fourth, a desirable embodiment of the component compounds will be explained. $R^1, R^2, R^3, R^4 R^5, R^6, R^7, R^8, R^9$ and $R^{10}$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine. Desirable $R^1, R^3, R^5, R^6, R^7, R^9$ and $R^{10}$ are each independently alkyl having 1 to 12 carbons for increasing the stability to ultraviolet light or heat. Desirable $R^2, R^4$ and $R^8$ are each independently alkoxy for increasing the absolute value of dielectric anisotropy.

Desirable alkyl is methyl, ethyl, propyl, butyl, pentyl, hexyl, heptyl or octyl. More desirable alkyl is ethyl, propyl, butyl, pentyl or heptyl for decreasing the viscosity.

Desirable alkoxy is methoxy, ethoxy, propoxy, butoxy, pentyloxy, hexyloxy or heptyloxy. More desirable alkoxy is methoxy or ethoxy for decreasing the viscosity.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. A more desirable alkenyl is vinyl, 1-propenyl, 3-butenyl or 3-pentenyl for decreasing the viscosity. A desirable configuration of —CH═CH— in the alkenyl depends on the position of the double bond. Trans is preferable in the alkenyl such as 1-propenyl, 1-butenyl, 1-pentenyl, 1-hexenyl, 3-pentenyl and 3-hexenyl for decreasing the viscosity. Cis preferable in the alkenyl such as 2-butenyl, 2-pentenyl and 2-hexenyl. In the alkenyl, straight-chain alkenyl is preferable to branched-chain alkenyl.

Desirable examples of alkenyl in which arbitrary hydrogen is replaced by fluorine are 2,2-difluorovinyl, 3,3-difluoro-2-propenyl, 4,4-difluoro-3-butenyl, 5,5-difluoro-4-pentenyl and 6,6-difluoro-5-hexenyl. More desirable examples are 2,2-difluoro-vinyl and 4,4-difluoro-3-butenyl for decreasing the viscosity.

Ring A is independently 1,4-cyclohexylene or 1,4-phenylene in which arbitrary hydrogen may be replaced by fluorine or chlorine, or tetrahydropyran-2,5-diyl. At least one of ring A is tetrahydropyran-2,5-diyl. Two arbitrary ring A may be the same or different when n is 2 or 3. Desirable ring A is tetrahydropyran-2,5-diyl for increasing the dielectric anisotropy. tetrahydropyran-2,5-diyl is:

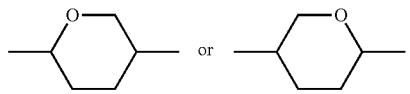

and desirably

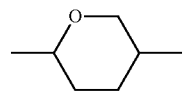

Ring B and ring C are each independently 1,4-cyclohexylene, 1,4-phenylene, 2-fluoro-1,4 phenylene, or 3-fluoro-1,4 phenylene. Arbitrary two ring B may be the same or different when p is 2 or 3. Desirable ring B or C is each independently 1,4-cyclohexylene for increasing the maximum temperature or decreasing the viscosity, and is 1,4-phenylene for increasing the optical anisotropy.

Ring D, ring E and ring F are each independently 1,4-cyclohexylene, or 1,4-phenylene. Arbitrary two ring D may be the same or different when q is 2 or 3. Arbitrary two ring E may be the same or different when r is 2 or 3. Arbitrary two ring F may be the same or different when s is 2 or 3. Desirable ring D, ring E, and ring F are each independently 1,4-cyclohexylene for increasing the maximum temperature or decreasing the viscosity, and is 1,4-phenylene for increasing the optical anisotropy.

$Z^1$ is methyleneoxy or carbonyloxy, and $Z^2, Z^3, Z^4$ and $Z^5$ are each independently a single bond, ethylene, methyleneoxy, carbonyloxy. Two arbitrary $Z^2$ may be the same or different when n is 2 or 3, two arbitrary $Z^3$ may be the same or different when p is 2 or 3, two arbitrary $Z^4$ may be the same or different when q is 2 or 3, and two arbitrary $Z^5$ may be the same or different when s is 2 or 3.

Desirable $Z^1$ and $Z^5$ are methyleneoxy for increasing the absolute value of dielectric anisotropy. Desirable $Z^2, Z^3$ and $Z^4$ are a single bond for decreasing the viscosity. Desirable $Z^5$ is methyleneoxy for increasing the absolute value of dielectric anisotropy.

$X^1$ and $X^2$ are each independently fluorine or chlorine. Desirable $X^1$ and $X^2$ are fluorine for increasing the dielectric anisotropy.

m is independently 1 or 2. Desirable m is 1 for decreasing the viscosity. n, p and s are each independently 1, 2, or 3. Desirable n and p are 2 or 3 for increasing the maximum temperature, and is 1 for decreasing the viscosity. Desirable s is 2 for increasing the maximum temperature. q and r are each independently 0, 1, 2 or 3, and the sum of q and r is 3 or less. Desirable q is 2 for increasing the maximum temperature. Desirable r is 0 for decreasing the minimum temperature.

Fifth, examples of the component compound will be shown. In the desirable compounds described below, $R^{11}$ is straight-chain alkyl having 1 to 12 carbons or straight-chain alkoxy having 1 to 12. $R^{12}$ and $R^{13}$ are each independently straight-chain alkyl having 1 to 12 carbons or straight-chain alkenyl having 2 to 12 carbons. $R^{14}$ and $R^{15}$ are each independently straight-chain alkyl having 1 to 12 carbons. With regard to the configuration of 1,4-cyclohexylene in these compounds, trans is preferable to cis for increasing the maximum temperature.

Desirable compound (1) are the compounds (1-1-1) to (1-4-1). More desirable compound (1) are the compound (1-1-1) and the compound (1-2-1). Especially desirable compound (1) is the compound (1-2-1). Desirable compound (2) are the compounds (2-1-1) to (2-4-1). More desirable compound (2) are the compound (2-2-1) and the compound (2-3-1). Especially desirable compound (2) is the compound (2-3-1). Desirable compound (3) are the compounds (3-1-1) to (3-13-1). More desirable compound (3) are the compound (3-1-1), the compound (3-5-1), the compound (3-7-1), the compound (3-8-1) and the compound (3-13-1). Especially desirable compound (3) are the compounds (3-1-1), the compound (3-5-1), and the compound (3-8-1). Desirable compound (4-1) are the compounds (4-1-1-1) to (4-1-12-1). More desirable compound (4-1) are the compound (4-1-1-3), the compound (4-1-2-1), the compound (4-1-4-1), the compound (4-1-7-1) and the compound (4-1-9-1). Especially desirable compound (4-1) are the compound (4-1-1-1), the compound (4-1-4-1), and the compound (4-1-7-1). Desirable compound (4-2) are the compound (4-2-2-1) and the compound (4-2-4-1).

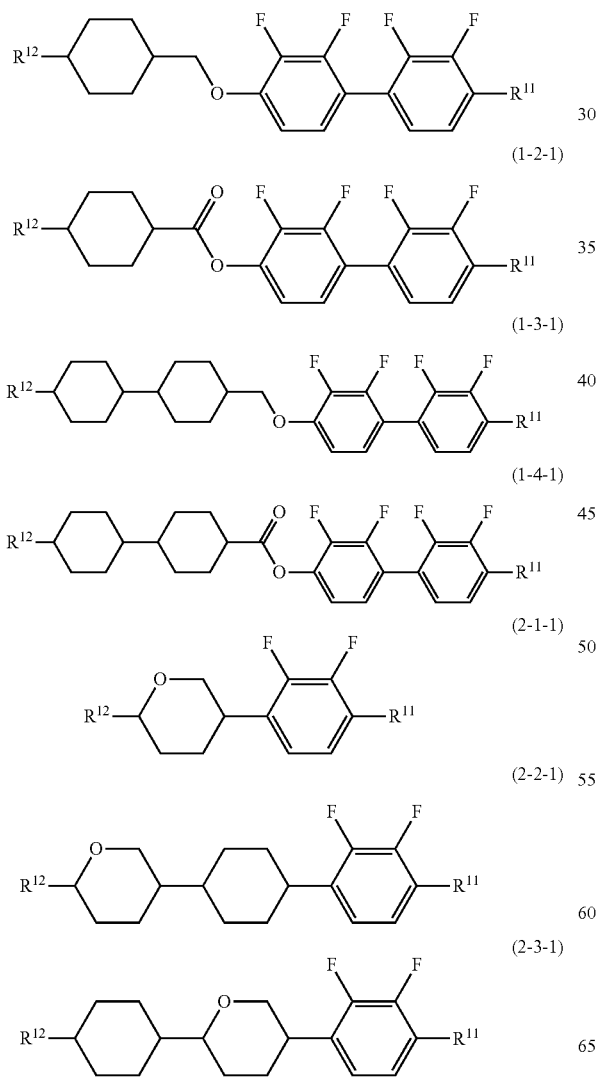

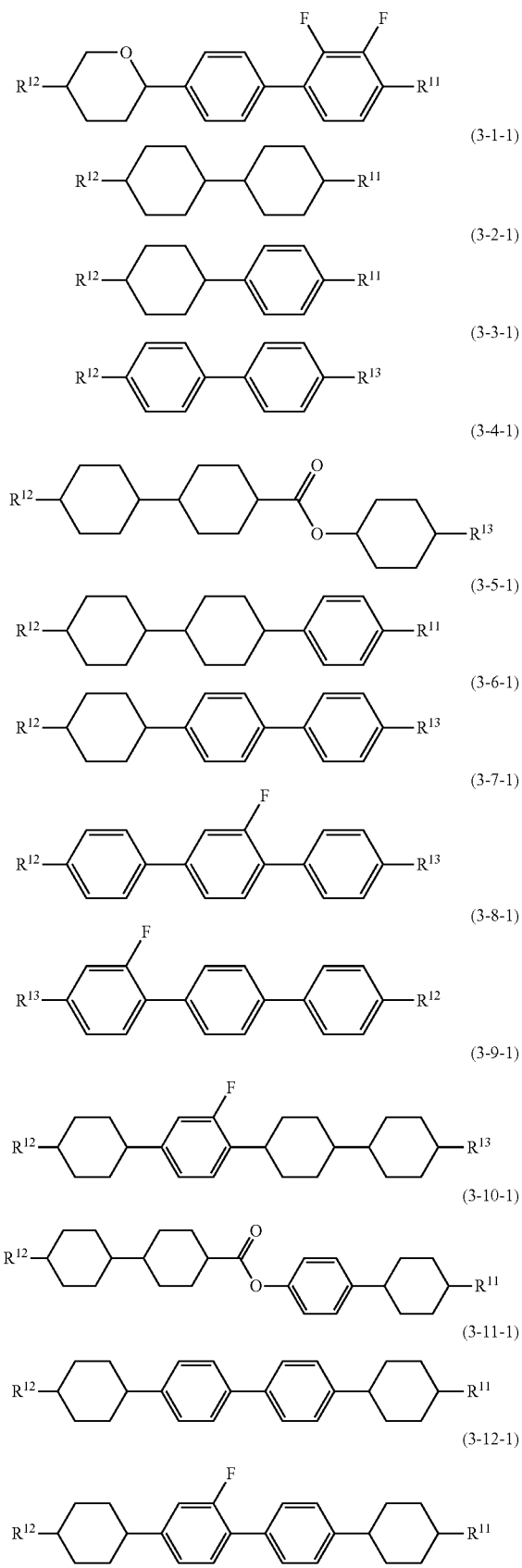

(3-13-1)
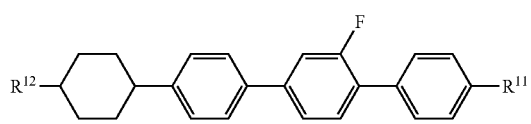

(4-1-1-1)
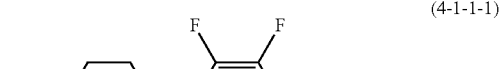

(4-1-2-1)
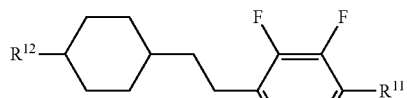

(4-1-3-1)
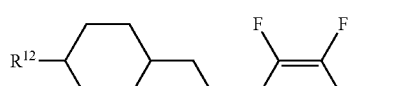

(4-1-4-1)
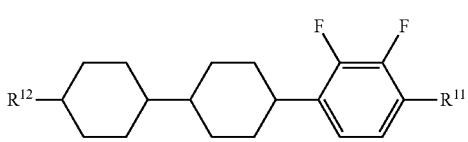

(4-1-5-1)
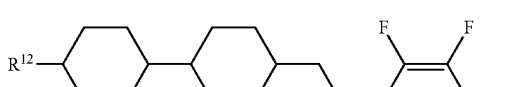

(4-1-6-1)
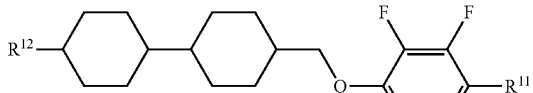

(4-1-7-1)
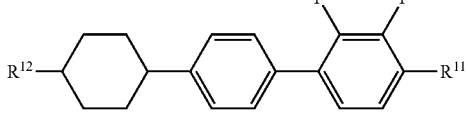

(4-1-8-1)

(4-1-9-1)
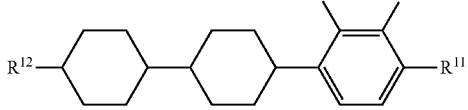

(4-1-10-1)
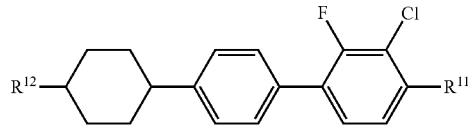

Sixth, additives which may be mixed into the composition will be explained. The additives include an optically active compound, an antioxidant, an ultraviolet light absorbent, a coloring matter, an antifoaming agent, a polymerizable compound and a polymerization initiator. Examples of the optically active compound include the Compound (5-1) to (5-4). A desirable ratio of the optically active compound is approximately 5% by weight or less. More desirable ratio is in the range of approximately 0.01% by weight to approximately 2% by weight.

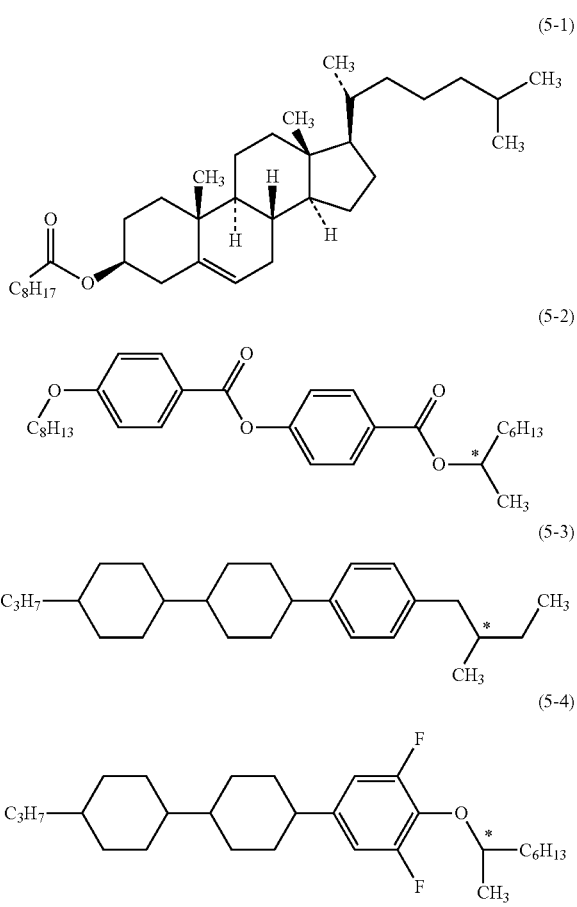

(5-1)
(5-2)
(5-3)
(5-4)

An antioxidant is mixed into the composition in order to prevent a decrease in specific resistance caused by heating in air, or to maintain a large voltage holding ratio at room temperature and also at a high temperature even after the device has been used for a long time.

Desirable examples of the antioxidant include the compound (6) wherein t is an integer of 1 to 9. In the compound (6), desirable t is 1, 3, 5, 7 or 9. A more desirable t is 1 or 7. The compound (6) wherein t is 1 is effective in preventing a decrease of the specific resistance caused by heating in the air because it has a large volatility. The compound (6) wherein t is 7 is effective in maintaining a large voltage holding ratio at room temperature and also at a high temperature even after the device has been used for a long time, because it has a small volatility. A desirable ratio of the antioxidant is approximately 50 ppm or more for achieving its effect and is approximately 600 ppm or less for avoiding a decrease of the maximum temperature or avoiding an increase of the minimum temperature. A more desirable ratio is in the range of approximately 100 ppm to approximately 300 ppm.

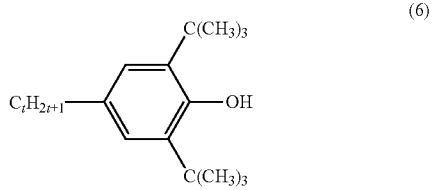

(6)

Desirable examples of the ultraviolet light absorbent include a benzophenone derivative, a benzoate derivative and a triazole derivative. A light stabilizer such as an amine having steric hindrance is also desirable. A desirable ratio of the ultraviolet light absorbent or the light stabilizer is approximately 50 ppm or more for achieving its effect and is approximately 10,000 ppm or less for avoiding a decrease of the maximum temperature or avoiding an increase of the minimum temperature. A more desirable ratio is in the range of approximately 100 ppm to approximately 10,000 ppm.

A dichroic dye such as an azo dye or an anthraquinone dye is mixed into the composition for adjusting to a device having a guest host (GH) mode. A desirable ratio of the dye is in the range of approximately 0.01% to approximately 10% by weight. An antifoaming agent such as dimethyl silicone oil or methyl phenyl silicone oil is mixed into the composition for preventing foam formation. A desirable ratio of the antifoaming agent is approximately 1 ppm or more for achieving its effect and is approximately 1,000 ppm or less for avoiding a poor display. A more desirable ratio is in the range of approximately 1 ppm to approximately 500 ppm.

A polymerizable compound is mixed into the composition for adjusting to a device having a PSA (polymer sustained alignment) mode. Desirable examples of the polymerizable compound include compounds having a polymerizable group, such as acrylates, methacrylates, vinyl compounds, vinyloxy compounds, propenyl ethers, epoxy compounds (oxirane, oxetane) and vinyl ketones. Especially desirable examples of the polymerizable compound are acrylate derivatives or methacrylate derivatives. A desirable ratio of the polymerizable compound is approximately 0.05% by weight or more for achieving its effect and is approximately 10% by weight or less for avoiding a poor display. A more desirable ratio is in the range of approximately 0.1% to approximately 2% by weight. The polymerizable compound is polymerized on irradiation with ultraviolet light or the like preferably in the presence of a suitable initiator such as a photopolymerization initiator. Suitable conditions for polymerization, suitable types of the initiator and suitable amounts thereof are known to a person skilled in the art and have been reported in the literature. For example, Irgacure 651 (registered trademark), Irgacure 184 (registered trademark) or Darocure 1173 (registered trademark) (Ciba Japan K. K.), which is a photoinitiator, is suitable for radical polymerization. Desirable ratio of the photopolymerization initiator is in the range of approximately 0.1% to approximately 5% by weight of the polymerizable compound. Especially desirable ratio is in the range of approximately 1% to approximately 3% by weight.

Seventh, methods for synthesizing the component compounds will be explained. These compounds can be synthesized according to known methods. The synthetic methods will be exemplified as follows. The compound (1) is synthesized by the later described method. The compound (2-3-1) is synthesized by the method later described in JP 2000-008040 A (2000). The compound (3-5-1) is synthesized by the method described in JP S57-165328 B (1982). The compound (4-1-1-1) is synthesized by the method described in JP 2000-053602 A (2000). The compound (4-2-4-1) is synthesized by the method described in JP 2005-35986 A (2005). An antioxidant is commercially available. The compound of formula (6), wherein t is 1, is available from Sigma-Aldrich Corporation. The compound of formula (6), wherein t is 7, is synthesized according to the method described in U.S. Pat. No. 3,660,505.

The compounds, of which the synthetic methods were not described here, can be synthesized according to methods described in books such as ORGANIC SYNTHESES (John Wiley & Sons, Inc.), ORGANIC REACTIONS (John Wiley & Sons, Inc.), COMPREHENSIVE ORGANIC SYNTHESIS (Pergamon Press), and NEW EXPERIMENTAL CHEMISTRY COURSE (Shin Jikken Kagaku Kouza, in Japanese title) (Maruzen Co., LTD.). The composition is prepared according to known methods using the compounds thus obtained. For example, the component compounds are mixed and dissolved in each other by heating.

Last, use of the composition will be explained. Most of the compositions have a minimum temperature of approximately −10° C. or lower, a maximum temperature of approximately 70° C. or higher, and an optical anisotropy in the range of approximately 0.07 to approximately 0.20. The device containing the composition has a large voltage holding ratio. The composition is suitable for an AM device. The composition is suitable especially for an AM device having a transmission type. The composition having an optical anisotropy in the range of approximately 0.08 to approximately 0.25 and the composition having an optical anisotropy even in the range of approximately 0.10 to approximately 0.30 may be prepared by adjusting the ratios of the component compounds or by mixing other liquid crystal compounds. The composition can be used as an optically active composition by adding an optically active compound.

The composition can be used for an AM device. It can also be used for a PM device. The composition can also be used for the AM and the PM device having a mode such as PC, TN, STN, ECB, OCB, IPS, VA or PSA. It is especially desirable to use the composition for the AM device having the TN, OCB or IPS mode. These devices may be of a reflection type, a transmission type or a semi-transmission type. It is desirable to use the composition for a device having the transmission type. The composition can also be used for an amorphous silicon-TFT device or a polycrystal silicon-TFT device. The composition is also usable for a nematic curvilinear aligned phase (NCAP) device prepared by microcapsulating the composition, and for a polymer-dispersed (PD) device in which a three dimensional network polymer is formed in the composition.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

The composition and the compound are used as a sample for measurement to evaluate the characteristics of the composition and the compound contained in the composition. When a sample was a composition, it was measured as it was, and the obtained value was described here. When a sample was a compound, a sample for measurement was prepared by mixing 15% by weight of the compound into 85% by weight of mother liquid crystals. A value of characteristic of the compound was calculated by extrapolating from a value obtained by measurement. That is: [extrapolated value]= [measured value of sample]−0.85×[measured value of mother liquid crystals]/0.15. When a smectic phase (or crystals) separated out at this ratio at 25° C., a ratio of the compound to mother liquid crystals was changed step by step in the order of (10% by weight/90% by weight), (5% by weight/ 95% by weight) and (1% by weight/99% by weight), respectively. Values for the maximum temperature, the optical anisotropy, the viscosity, and the dielectric anisotropy of the compound were obtained by means of the extrapolation.

The components of the mother liquid crystals were as follows. The ratio of the components is expressed by percentage by weight.

$C_3H_7$—⟨⟩—COO—⟨⟩—$OC_2H_5$   17.2 wt %

$C_3H_7$—⟨⟩—COO—⟨⟩—$OC_4H_9$   27.6 wt %

$C_4H_9$—⟨⟩—COO—⟨⟩—$OC_2H_5$   20.7 wt %

$C_5H_{11}$—⟨⟩—COO—⟨⟩—$OCH_3$   20.7 wt %

$C_5H_{11}$—⟨⟩—COO—⟨⟩—$OC_2H_5$   13.8 wt %

Characteristics were measured according to the following methods. Most methods are described in the Standard of Electronic Industries Association of Japan, EIAJ•ED-2521A, or those with some modifications.

Maximum Temperature of Nematic Phase (NI; ° C.): A sample was placed on a hot plate in a melting point apparatus equipped with a polarizing microscope and was heated at the rate of 1° C. per minute. Temperature was measured when part of the sample began to change from a nematic phase to an isotropic liquid. A higher limit of the temperature range of a nematic phase may occasionally be abbreviated to "the maximum temperature."

Minimum Temperature of Nematic Phase ($T_c$; ° C.): A sample having a nematic phase was put in glass vials and then kept in freezers at temperatures of 0° C., −10° C., −20° C., −30° C. and −40° C. for 10 days, and then the liquid crystal phases were observed. For example, when the sample still remained of the nematic phase at −20° C. and changed to crystals or a smectic phase at −30° C., $T_c$ was expressed as ≦−20° C. A lower limit of the temperature range of a nematic phase may occasionally be abbreviated to "the minimum temperature."

Viscosity (bulk viscosity; η; measured at 20° C.; mPa·s): Viscosity was measured by use of an E-type viscometer.

Optical Anisotropy (refractive index anisotropy; Δn; measured at 25° C.): Measurement was carried out by use of an Abbe refractometer with a polarizing plate mounted on the ocular, on irradiation with light at a wavelength of 589 nm. The surface of the main prism was rubbed in one direction, and then a sample was dropped on the main prism. A refractive index (n∥) was measured when the direction of polarized light was parallel to that of the rubbing. A refractive index (n⊥) was measured when the direction of polarized light was perpendicular to that of the rubbing. The value of optical anisotropy was calculated from the equation: Δn=n∥−n⊥.

Dielectric Anisotropy (Δ∈; measured at 25° C.): The value of dielectric anisotropy was calculated from the equation: Δ∈=∈∥−∈⊥. Dielectric constants (∈∥ and ∈⊥) were measured as follows.

1) Measurement of a dielectric constant (∈∥): A solution of octadecyltriethoxysilane (0.16 mL) in ethanol (20 mL) was applied to a thoroughly cleaned glass substrate. The glass substrate was rotated with a spinner, and then heated at 150° C. for one hour. A sample was put in a VA device having the distance between two glass substrates (cell gap) of 4 μm, and then the device was sealed with an adhesive curable on irradiation with ultraviolet light. Sine waves (0.5 V, 1 kHz) were impressed onto the device, and a dielectric constant (∈∥) in a major axis direction of liquid crystal molecules was measured after 2 seconds.

2) Measurement of a dielectric constant (∈⊥): A polyimide solution was applied to a thoroughly cleaned glass substrate. The glass substrate was heated, and then the alignment film obtained was subjected to a rubbing treatment. A sample was put in a TN device having the distance between two glass substrates (cell gap) of 9 μm and a twist angle of 80°. Sine waves (0.5 V, 1 kHz) were impressed onto the device, and a dielectric constant (∈⊥) in a minor axis direction of liquid crystal molecules was measured after 2 seconds.

Threshold Voltage (Vth; measured at 25° C.; V): Measurement was carried out with an LCD Evaluation System Model LCD-5100 made by Otsuka Electronics Co., Ltd. The light source was a halogen lamp. A sample was poured into a VA device having a normally black mode, in which the distance between two glass substrates (cell gap) was 4 μm and a rubbing direction was antiparallel, and then the device was sealed with an ultraviolet light-curable adhesive. Voltage to be impressed onto the device (60 Hz, rectangular waves) was stepwise increased in 0.02 V increments from 0 V up to 20 V. During the increase, the device was irradiated with light in a perpendicular direction, and the amount of light passing through the device was measured. A voltage-transmission curve was prepared, in which the maximum amount of light corresponded to 100% transmittance and the minimum amount of light corresponded to 0% transmittance. The threshold voltage was voltage at 10% transmittance.

Voltage Holding Ratio (VHR-1; measured at 25° C.; %): A TN device used for measurement had a polyimide-alignment film, and the distance between two glass substrates (cell gap) was 5 μm. A sample was poured into the device, and then the device was sealed with an adhesive polymerizable on irradiation with ultraviolet light. The TN device was impressed and charged with pulse voltage (60 microseconds at 5 V). A decreasing voltage was measured for 16.7 milliseconds with a high-speed voltmeter, and the area A between a voltage curve and a horizontal axis in a unit cycle was obtained. The area B was an area without the decrease. The voltage holding ratio was a percentage of the area A to the area B.

Voltage Holding Ratio (VHR-2; measured at 80° C.; %): A TN device used for measurement had a polyimide-alignment film, and the distance between two glass substrates (cell gap) was 5 μm. A sample was poured into the device, and then the device was sealed with an adhesive polymerizable on irradiation with ultraviolet light. The TN device was impressed and charged with pulse voltage (60 microseconds at 5 V). A decreasing voltage was measured for 16.7 milliseconds with a high-speed voltmeter, and the area A between a voltage curve and a horizontal axis in a unit cycle was obtained. The area B was an area without the decrease. The voltage holding ratio was a percentage of the area A to the area B.

Voltage Holding Ratio (VHR-3; measured at 25° C.; %): A voltage holding ratio was measured after irradiation with ultraviolet light, evaluating stability to ultraviolet light. A TN device used for measurement had a polyimide-alignment film and the cell gap was 5 μm. A sample was poured into the device, and then the device was irradiated with light for 20 minutes. The light source was an ultra high-pressure mercury lamp USH 500D (produced by Ushio, Inc.), and the distance between the device and the light source was 20 cm. In the measurement of VHR-3, a decreasing voltage was measured for 16.7 milliseconds. A composition having a large VHR-3 has a high stability to ultraviolet light. The value of VHR-3 is preferably 90% or more, and more preferably 95% or more.

Voltage Holding Ratio (VHR-4; measured at 25° C.; %): A TN device into which a sample was poured was heated in a constant-temperature bath at 80° C. for 500 hours, and then the voltage holding ratio was measured, evaluating stability to heat. In the measurement of VHR-4, a decreasing voltage was measured for 16.7 milliseconds. A composition having a large VHR-4 has a high stability to heat.

Response Time (τ; measured at 25° C.; millisecond): Measurement was carried out with an LCD Evaluation System Model LCD-5100 made by Otsuka Electronics Co., Ltd. The light source was a halogen lamp. The low-pass filter was set at 5 kHz. A sample was poured into a VA device having a normally black mode, in which the cell gap between two glass substrates was 4 μm, and a rubbing direction was antiparallel, and then the device was sealed with an ultraviolet light-curable adhesive. Rectangular waves (60 Hz, 10 V, 0.5 second) were impressed to the device. The device was simultaneously irradiated with light in a perpendicular direction, and the amount of light passing through the device was measured. The maximum amount of light corresponded to 100% transmittance, and the minimum amount of light corresponded to 0% transmission. The response time was the period of time required for the change in transmittance from 90% to 10% (fall time: millisecond).

Specific Resistance (ρ; measured at 25° C.; Ω cm): A sample of 1.0 milliliters was poured into a vessel equipped with electrodes. DC voltage (10 V) was impressed to the vessel, and the DC current was measured after 10 seconds. The specific resistance was calculated according to the following equation. [specific resistance]=([voltage]×[electric capacity of vessel])/([DC current]×[dielectric constant in a vacuum]).

Gas Chromatographic Analysis: A Gas Chromatograph Model GC-14B made by Shimadzu Corporation was used for measurement. The carrier gas was helium (2 milliliters per minute). The evaporator and the detector (FID) were set up at 280° C. and 300° C., respectively. A capillary column DB-1 (length 30 meters, bore 0.32 millimeter, film thickness 0.25 μm, dimethylpolysiloxane as the stationary phase, non-polar) made by Agilent Technologies, Inc. was used for the separation of component compounds. After the column had been kept at 200° C. for 2 minutes, it was further heated to 280° C. at the rate of 5° C. per minute. A sample was dissolved in acetone (0.1% by weight) and 1 microliter of the solution was injected into the evaporator. A recorder used was a Model C-R5A Chromatopac Integrator made by Shimadzu Corporation or its equivalent. A gas chromatogram obtained showed the retention time of peaks and the peak areas corresponding to the component compounds.

Solvents for diluting the sample may also be chloroform, hexane, and so forth. The following capillary columns may also be used in order to separate the component compounds: HP-1 made by Agilent Technologies Inc. (length 30 meters, bore 0.32 millimeter, film thickness 0.25 μm), Rtx-1 made by Restek Corporation (length 30 meters, bore 0.32 millimeter, film thickness 0.25 μm), and BP-1 made by SGE International Pty. Ltd. (length 30 meters, bore 0.32 millimeter, film thickness 0.25 μm). A capillary column CBP1-M50-025 (length 50 meters, bore 0.25 millimeter, film thickness 0.25 μm) made by Shimadzu Corporation may also be used for the purpose of avoiding an overlap of peaks of the compounds.

The ratio of the liquid crystal compound included in the composition may be calculated according to the following method. The liquid crystal compounds are detected by use of a gas chromatograph. The ratio of peak areas in the gas chromatogram corresponds to the ratio (in moles) of the liquid crystal compounds. When the capillary columns described above are used, the correction coefficient of respective liquid crystal compounds may be regarded as 1 (one). Accordingly, the ratio (% by weight) of the liquid crystal compound can be calculated from the ratio of peak areas.

$^1$H-NMR Analysis:

DRX-500 (produced by Bruker Biospin Co., Ltd.) was used for measurement. A sample produced in the examples and so forth was dissolved in a deuterated solvent capable of dissolving the sample, such as $CDCl_3$, and the measurement was carried out at room temperature and 500 MHz with an accumulated number of 24. In the description of the resulting nuclear resonance spectra, s means a singlet, d means a doublet, t means a triplet, q means a quartet, and m means a multiplet, br means broad. Tetramethylsilane (TMS) was used as a standard substance indicating zero point of chemical shift δ.

The invention will be explained in detail by way of Examples. The invention is not limited by Examples described below. The compounds described in Comparative Examples and Examples were expressed as symbols according to the definition in the following Table 3. In Table 3, the configuration of 1,4-cyclohexylene is trans. A parenthesized number next to the symbolized compound in Examples correspond to the compound's number. The symbol (–) means other liquid crystal compounds. Ratios (percentage) of liquid crystal compounds mean the percentages by weight (% by weight) based on the total weight of the liquid crystal composition. The liquid crystal composition includes an impurity in addition to these compounds. Last, characteristics of the composition were summarized.

TABLE 3

Method for Description of Compounds Using Symbols
R—(A$_1$)—Z$_1$—...—Z$_n$—(A$_n$)—R$^1$

| 1) Left-terminal Group R | Symbol |
|---|---|
| $C_nH_{2n+1}$— | n- |
| $C_nH_{2n+1}$O— | nO— |
| $C_nH_{2m+1}OC_nH_{2n}$— | mOn— |
| $CH_2$=CH— | V— |
| $C_nH_{2n+1}$—CH=CH— | nV— |
| $CH_2$=CH—$C_nH_{2n}$— | Vn— |
| $C_mH_{2m+1}$—CH=CH—$C_nH_{2n}$— | mVn— |
| $CF_2$=CH— | VFF— |
| $CF_2$=CH—$C_nH_{2n}$— | VFFn— |

| 2) Left-terminal Group —I | Symbol |
|---|---|
| —$C_nH_{2n+1}$ | -n |
| —$OC_nH_{2n+1}$ | —On |
| —CH=$CH_2$ | —V |
| —CH=CH—$C_nH_{2n+1}$ | —Vn |
| —$C_nH_{2n}$—CH=$CH_2$ | —nV |
| —CH=$CF_2$ | —VFF |
| —$COOCH_3$ | —EMe |

TABLE 3-continued

Method for Description of Compounds Using Symbols
R—(A$_1$)—Z$_1$—...—Z$_n$—(A$_n$)—R$^1$

| 3) Bonding Group —Z$_n$— | Symbol |
|---|---|
| —$C_2H_4$— | 2 |
| —COO— | E |
| —CH=CH— | V |
| —C≡C— | T |
| —$CF_2$O— | X |
| —$OCF_2$— | x |
| —$CH_2$O— | 10 |

| 4) Ring Structure —A$_n$— | Symbol |
|---|---|
|  | H |
| 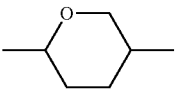 | Dh |
| 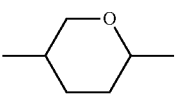 | dh |
|  | B |
| 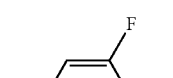 | B(F) |
| 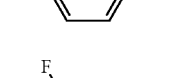 | B(2F) |
| 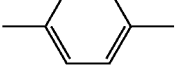 | B(2F,5F) |
| 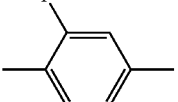 | B(2F,3F) |
|  | B(2F,3F,6Me) |

TABLE 3-continued

Method for Description of Compounds Using Symbols
R—(A₁)—Z₁— ... —Zₙ—(Aₙ)—R¹

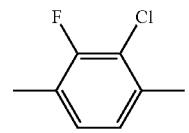  B(2F,3CL)

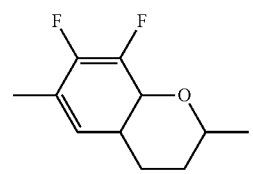  Cro(7F,8F)

5) Examples of Description

Example 1. V—HH-3

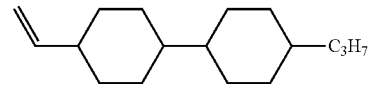

Example 2. 3-HEB(2F,3F)B(2F,3F)—O2

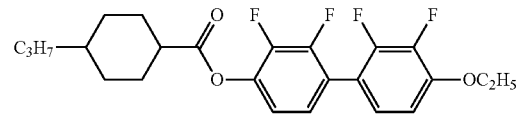

Example 3. 3-HHB-1

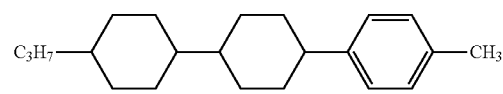

Example 4. 3-HDhB(2F,3F)—O2

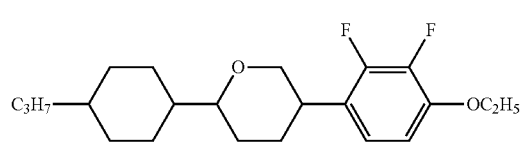

Reference Example 1

Synthesis of 4'-ethoxy-2,3,2',3'-tetrafluoro-4-(4'-vinylbicyclohexyl-4-ylmeth oxy)-biphenyl (a7)

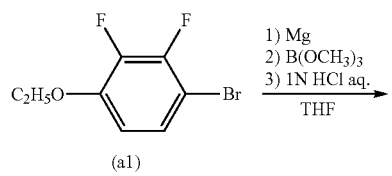

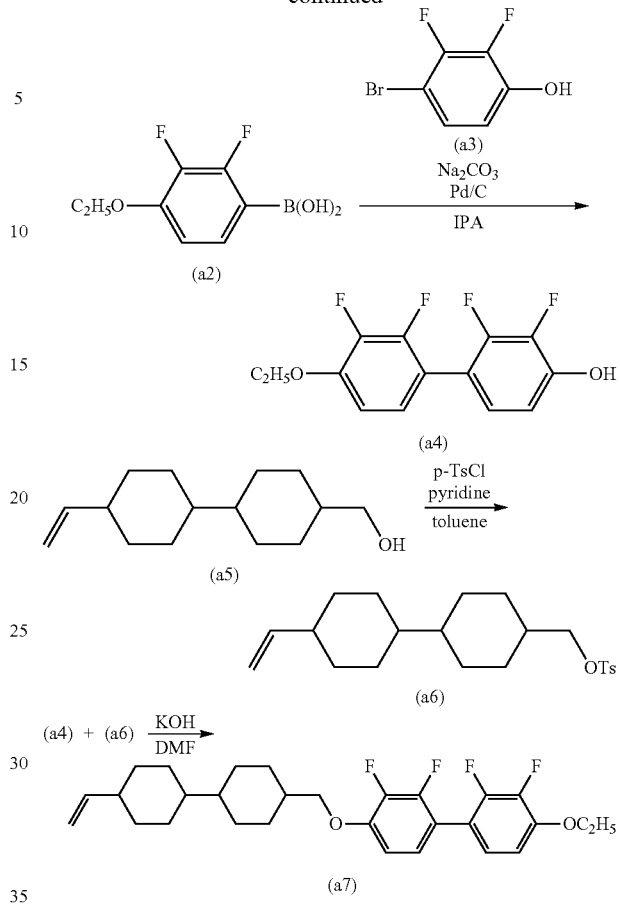

First Step

In a reactor under a nitrogen atmosphere, 50 ml of tetrahydrofuran (THF) was added to 6.15 g of magnesium (Mg), and stirred at 44° C. 60.0 g of 1-bromo-4-etoxy-2,3-difluorobenzene (a1) dissolved in 130 ml of THF was added dropwise thereto in the temperature range of 38° C. to 49° C. for 1 hour. The resulting solution was added dropwise to a solution of 200 ml of THF and 39.5 g of trimethyl boratein in the temperature range of −50° C. to −30° C. The resulting reaction solution was injected into a mixture of 500 ml of 1N hydrochloric acid and 600 ml of ethyl acetate. The mixture was thereafter allowed to separate into organic layer and aqueous layer, and the organic layer was extracted. The resulting organic layer was washed with saturated chloride aqueous solution and dried over anhydrous magnesium sulfate, and the solvent was concentrated under reduced pressure to provide the residue. The resulting residue was purified by recrystallization from a heptane, dried to provide 41.6 g of 4-ethoxy-2,3-difluorophenylboronic acid (a2) as a yellow solid.

Second Step

In a reactor under nitrogen atmosphere, 20.0 g of compound (a2), 17.2 g of 4-bromo-2,3-difluorophenol (a3), 30.6 g of sodium carbonate, 0.54 g of palladium on carbon catalyst (Pd/C) were dissolved in 120 mL of 2-propanol (IPA), followed by stirring by refluxing for 10 hours. The reaction mixture was cooled to room temperature, and injected into a mixture of 500 ml of 1N hydrochloric acid and 300 ml of toluene which were cooled into 0° C. The mixture was allowed to separate into organic layer and aqueous layer and the organic layer was extracted. The resulting organic layer was washed with saturated chloride aqueous solution, dried over anhydrous magnesium sulfate, and the solvent was concentrated under reduced pressure to provide the residue. The resulting residue was purified by recrystallization from heptan, and dried to provide 13.2 g of 4'-ethoxy-2,3,2',3'-tetrafluorobiphenyl-4-ol (a4) as a white solid.

Third Step

In a reactor under nitrogen atmosphere, 20.0 g of (4'-vinylbicyclohexyl-4-yl)-methanol (a5) was added into 100 ml of pyridine, and stirred at 5° C. The solution in which 34.3 g of p-p-toluenesulfonyl chloride (p-TsCl) was dissolved in 50 ml of toluene was added dropwise to the solution, and stirred at room temperature for 20 hours. The resulting reaction mixture was injectetd into a mixture of 200 ml of the water and 200 ml of toluene which were cooled into 0° C. The mixture was allowed to separate into organic layer and aqueous layer, and the organic layer was extracted. The resulting organic layer was washed with water, dried over anhydrous magnesium sulfate, and the solvent was concentrated under reduced pressure to provide the residue. The resulting residue was purified by column chromatography (silica gel; toluene). The solvent was concentrated under reduced pressure to provide 32.1 g of 4'-vinylbicyclohexyl-4-ylmethltoluene-4-sulfonic acid (a6) as a white solid.

The compound (a5) can be synthesized according to the synthesis methods described in International publication No. 2006/064853, and so forth.

Fourth Step

In a reactor 4.0 g of compound (a4), 5.3 g of compound (a6) and 1.2 g of potassium hydroxide (KOH) were added into 30 ml of N,N-dimethylformamide (DMF), and stirred at 60° C. for 14 hours. The reaction mixture was cooled to 30° C., to which 100 ml of water and 100 ml of toluene were added. The mixture was allowed to separate into organic layer and aqueous layer and the organic layer was extracted. The resulting organic layer was separated and washed with water and dried over anhydrous magnesium sulfate. The solvent was distilled off under reduced pressure to provide the residue. The resulting residue was purified by column chromatography (silica gel; toluene), further purified by re-crystallization from (volume ratio Solmix A-11: toluene=1:2), and dried to provide 2.5 g of 4'-ethoxy-2,3,2',3'-tetrafluoro-4-(4'-vinylbicyclohexyl-4-ylmetoxy)-biphenyl (a7).

The chemical shifts δ (ppm) in $^1$H-NMR analysis were as follows, and thus the resulting compound was identified as 4'-etoxy-2,3,2',3'-tetrafluoro-4-(4'-vinylbicyclohexyl-4-ylmetoxy)-biphenyl (a7). The solvent for measurement was CDCl$_3$.

Chemical shift δ (ppm): 7.03-6.98 (m, 2H), 6.81-6.76 (m, 2H), 5.81-5.74 (m, 1H), 4.98-4.94 (d, 1H), 4.89-4.87 (d, 1H), 4.16 (q, 2H), 3.86 (d, 2H), 1.96-1.77 (m, 10H), 1.48 (t, 3H) 1.09-1.02 (m, 10H).

The resulting compound (a7) had phase transition temperatures (° C.) of Cr, 131.5 N, 230.1 Iso.

Reference Example 2

Synthesis of 4'-ethoxy-2,3,2',3'-tetrafluoro-4-(trans-4-vinylcyclohexylmethoxy)-biphenylmethoxy)-biphenyl (a10)

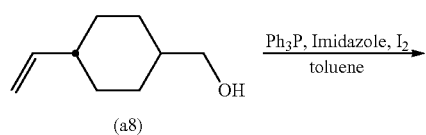

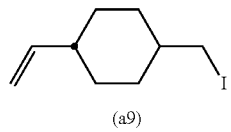

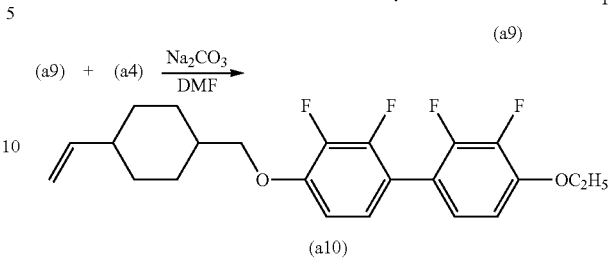

First Step 12.0 g of compounds (a8), 7.6 g of imidazole and 29.2 g of triphenylphosphine (Ph$_3$P) were added to 200 ml of toluene under nitrogen atmosphere, and stirred at 5° C. 27.2 g of iodine divided by 10 parts were added thereto in the temperature range of 5° C. to 10° C., further stirred for three hours to verify the completion of reaction by GC analysis. The resulting reaction mixture was filtered to remove deposit, and the solvent was distilled off from the resulting filtrate under reduced pressure. The resulting residue was purified by column chromatography (heptane, silica gel), and dried to provide 15.2 g of 1-iodidemethyl-trans-4-vinylcyclohexane (a9). The compounds (a8) can be synthesized according to the synthesis methods described in International publication No. 2006/064853, and so forth.

Second Step 4.4 g of compound (a4) and 3.2 g of sodium carbonate were added into 20 ml of DMF under nitrogen atmosphere, and stirred at 80° C. 3.8 g of compound (a9) was added thereto, stirred at 80° C. for an hour. The resulting reaction mixture was cooled to 30° C., to which 30 ml of water and 30 ml of toluene were added. The mixture was allowed to separate into organic layer and aqueous layer, and the organic layer was extracted. The resulting organic layer was separated, washed with salt water and dried over anhydrous magnesium sulfate. The solvent was distilled off under reduced pressure to provide the residue. The resulting residue was purified by column chromatography (volume ratio; heptane: toluene=4:1), further purified by re-crystallization from the solvent mixture of Solmix A-11 and heptane (volume ratio; Solmix A-11: heptane=1:2), and dried to provide 1.8 g of 4'-ethoxy-2,3,2, 3'-tetrafluoro-4-(trans-4-vinylcyclohexylmethoxy)-biphenyl (a10).

The chemical shifts δ (ppm) in $^1$H-NMR analysis were as follows, and thus the resulting compound was identified as 4-ethoxy-2,3,2',3'-tetrafluoro-4-(trans-4-vinylcyclohexylmetoxy)-biphenyl. The solvent for measurement was CDCl$_3$.

Chemical shift δ (ppm): 7.03-6.99 (m, 2H), 6.81-6.77 (m, 2H), 5.83-5.76 (m, 1H), 5.02-4.97 (d, 1H), 4.93-4.92 (d, 1H), 4.16 (q, 2H), 3.88 (d, 2H), 1.98-1.96 (m, 3H), 1.86-1.82 (m, 3H), 1.49 (t, 3H)-1.22-1.10 (m, 4H).

The resulting compound (a10) had phase transition temperatures (° C.) of Cr, 66.4 N, 104.8 Iso.

Comparative Example 1

Example 12 was selected from the compositions disclosed in JP 2007-2132 A. The basis is that the composition contains compounds (1-1-1) and (3). The components and characteristics of the composition were as follows. The compositions were prepared and measured according to the methods described above, because the response time at 25° C. was not described.

| | | |
|---|---|---|
| 3-HB(F)-3 | (3) | 2% |
| 3-HHB(2F)-1 | (3) | 3% |
| 3-HHB(2F)-2 | (3) | 4% |
| 3-HHB(F)—O2 | (3) | 3% |
| 3-HBB(F)—O2 | (3) | 3% |
| 3-HH1OB(2F)—O2 | (3) | 3% |
| 3-HxB(2F,3F)-1 | (—) | 8% |
| 3-H2XB(2F,3F)—O1 | (—) | 12% |
| 3-H1OB(2F,3F)B(2F,3F)—O2 | (1-1-1) | 2% |
| 3-HO1B(2F,3F)B(2F,3F)—O2 | (—) | 2% |
| 3-HXB(2CF3)B(2F,3F)—O1 | (—) | 1% |
| 3-HXB(2F)B(2F,3F)—O1 | (—) | 3% |
| 3-HxB(F)B(2F,3F)—O1 | (—) | 6% |
| 3-H2xB(2F,3F)B(2F,3F)-1 | (—) | 4% |
| 3-HB2B(2CF2H,3F)B—O2 | (—) | 1% |
| 3-HB1OB(2CF2H,3F)B—O2 | (—) | 2% |
| 5-HBO1B(2CF2H,3F)B-1 | (—) | 1% |
| 3-HXB(2F,3F)B—O2 | (—) | 1% |
| 3-HxB(2F,3F)B—O1 | (—) | 1% |
| 3-HHxB(2F,3F)—O1 | (—) | 4% |
| 3-HH2XB(2F,3F)-1 | (—) | 6% |
| 3-HB(2F,3F)XB(2F,3F)-1 | (—) | 4% |
| 3-HB2XB(2F,3F)—O1 | (—) | 10% |
| 3-HB2xB(2F,3F)—O2 | (—) | 10% |
| 3-HB(2F,3F)2xB(2F,3F)—O1 | (—) | 4% |

NI = 100.0° C.;
Tc ≦ −20° C.;
$\Delta n$ = 0.109;
$\eta$ = 50.0 mPa · s;
$\Delta\epsilon$ = −4.3;
$\tau$ = 25.3 ms.

Example 1

| | | |
|---|---|---|
| 3-HEB(2F,3F)B(2F,3F)—O2 | (1-2-1) | 4% |
| 5-HEB(2F,3F)B(2F,3F)—O2 | (1-2-1) | 4% |
| 3-HDhB(2F,3F)—O2 | (2-3-1) | 8% |
| 2-HH-3 | (3-1-1) | 16% |
| 3-HH-4 | (3-1-1) | 12% |
| 3-HHB-1 | (3-5-1) | 8% |
| 3-HHB-3 | (3-5-1) | 8% |
| 3-HB(2F,3F)—O2 | (4-1-1-1) | 8% |
| 5-HB(2F,3F)—O2 | (4-1-1-1) | 8% |
| 3-HHB(2F,3F)—O2 | (4-1-4-1) | 6% |
| 5-HHB(2F,3F)—O2 | (4-1-4-1) | 6% |
| 3-HBB(2F,3F)—O2 | (4-1-7-1) | 6% |
| 5-HBB(2F,3F)—O2 | (4-1-7-1) | 6% |

NI = 96.5° C.;
Tc ≦ −30° C.;
$\Delta n$ = 0.091;
$\eta$ = 26.5 mPa · s;
$\Delta\epsilon$ = −3.1;
Vth = 2.25 V;
$\tau$ = 10.1 ms;
VHR-1 = 99.2%;
VHR-2 = 98.4%;
VHR-3 = 98.1%.

Example 2

| | | |
|---|---|---|
| 3-HEB(2F,3F)B(2F,3F)—O2 | (1-2-1) | 4% |
| 3-HHEB(2F,3F)B(2F,3F)—O2 | (1-4-1) | 4% |
| 3-DhHB(2F,3F)—O2 | (2-2-1) | 8% |
| V—HH-3 | (3-1-1) | 20% |
| 1V—HH-3 | (3-1-1) | 4% |
| 3-HB—O2 | (3-2-1) | 6% |
| V—HHB-1 | (3-5-1) | 9% |
| 3-B(F)BB-2 | (3-8-1) | 5% |
| 3-HHEBH-3 | (3-10-1) | 3% |
| 3-HHEBH-4 | (3-10-1) | 3% |
| V—HB(2F,3F)—O2 | (4-1-1-1) | 7% |
| V—HB(2F,3F)—O4 | (4-1-1-1) | 7% |
| 3-HBB(2F,3F)—O2 | (4-1-7-1) | 7% |
| 5-HBB(2F,3F)—O2 | (4-1-7-1) | 7% |
| 2-HHB(2F,3CL)—O2 | (4-1-9-1) | 3% |
| 3-HHB(2F,3CL)—O2 | (4-1-9-1) | 3% |

NI = 99.7° C.;
Tc ≦ −30° C.;
$\Delta n$ = 0.106;
$\eta$ = 26.6 mPa · s;
$\Delta\epsilon$ = −2.7;
Vth = 2.50 V;
$\tau$ = 10.3 ms;
VHR-1 = 99.1%;
VHR-2 = 98.3%;
VHR-3 = 98.0%.

Example 3

| | | |
|---|---|---|
| 5-H1OB(2F,3F)B(2F,3F)—O2 | (1-1-1) | 4% |
| 3-HEB(2F,3F)B(2F,3F)—O2 | (1-2-1) | 5% |
| 5-HEB(2F,3F)B(2F,3F)—O2 | (1-2-1) | 5% |
| 3-dhBB(2F,3F)—O2 | (2-4-1) | 6% |
| 2-HH-3 | (3-1-1) | 16% |
| V—HH-4 | (3-1-1) | 10% |
| V—HH-5 | (3-1-1) | 9% |
| 3-HHEH-3 | (3-4-1) | 3% |
| V—HHB-1 | (3-5-1) | 5% |
| V2—HHB-1 | (3-5-1) | 5% |
| 5-HBBH-3 | (3-11-1) | 3% |
| 3-HB(2F,3F)—O2 | (4-1-1-1) | 6% |
| 3-H2B(2F,3F)—O2 | (4-1-2-1) | 6% |
| V—HHB(2F,3F)—O2 | (4-1-4-1) | 5% |
| V—HHB(2F,3F)—O4 | (4-1-4-1) | 5% |
| 3-HBB(2F,3CL)—O2 | (4-1-10-1) | 4% |
| 3-HH1OCro(7F,8F)-5 | (4-2-4-1) | 3% |

NI = 90.3° C.;
Tc ≦ −30° C.;
$\Delta n$ = 0.088;
$\eta$ = 27.1 mPa · s;
$\Delta\epsilon$ = −2.7;
Vth = 2.48 V;
$\tau$ = 10.7 ms;
VHR-1 = 99.1%;
VHR-2 = 98.4%;
VHR-3 = 98.1%.

Example 4

| | | |
|---|---|---|
| 3-HEB(2F,3F)B(2F,3F)—O | (1-2-1) | 4% |
| 3-HH1OB(2F,3F)B(2F,3F)—O4 | (1-3-1) | 3% |
| 3-HHEB(2F,3F)B(2F,3F)—O2 | (1-4-1) | 3% |
| 3-HDhB(2F,3F)—O2 | (2-3-1) | 8% |
| 2-HH-3 | (3-1-1) | 15% |
| 3-HH-4 | (3-1-1) | 13% |
| 3-HH-5 | (3-1-1) | 10% |
| V2—BB-1 | (3-3-1) | 7% |
| 2-BB(F)B-3 | (3-7-1) | 4% |
| 5-B(F)BB-2 | (3-8-1) | 4% |
| 5-HBB(F)B-3 | (3-13-1) | 3% |
| 3-H1OB(2F,3F)—O2 | (4-1-3-1) | 5% |
| 3-HH1OB(2F,3F)—O2 | (4-1-6-1) | 5% |
| 5-H1OB(2F,3CL)—O2 | (4-1-11-1) | 5% |
| 5-HH1OB(2F,3CL)—O2 | (4-1-12-1) | 5% |

| | | |
|---|---|---|
| 3-H1OCro(7F,8F)-5 | (4-2-2-1) | 3% |
| 3-HH1OCro(7F,8F)-5 | (4-2-4-1) | 3% |

NI = 83.4° C.;
Tc ≦ −20° C.;
$\Delta n$ = 0.096;
$\eta$ = 28.6 mPa·s;
$\Delta\epsilon$ = −3.0;
Vth = 2.29 V;
$\tau$ = 11.3 ms;
VHR-1 = 99.2%;
VHR-2 = 98.5%;
VHR-3 = 98.2%.

Example 5

| | | |
|---|---|---|
| 5-H1OB(2F,3F)B(2F,3F)—O2 | (1-1-1) | 4% |
| 5-HH1OB(2F,3F)B(2F,3F)—O2 | (1-3-1) | 3% |
| 5-DhB(2F,3F)—O2 | (2-1-1) | 3% |
| 3-HDhB(2F,3F)—O2 | (2-3-1) | 3% |
| V—HH-3 | (3-1-1) | 20% |
| VFF—HH-3 | (3-1) | 5% |
| 5-HB—O2 | (3-2-1) | 9% |
| 5-HBB-2 | (3-6-1) | 5% |
| 3-HB(F)HH-5 | (3-9-1) | 4% |
| 5-HB(F)HH—V | (3-9-1) | 4% |
| 1V2—HB(2F,3F)—O2 | (4-1-1-1) | 6% |
| V—HB(2F,3F)—O2 | (4-1-1-1) | 6% |
| V—HB(2F,3F)—O4 | (4-1-1-1) | 6% |
| 1V2—HHB(2F,3F)—O2 | (4-1-4-1) | 6% |
| 3-HH2B(2F,3F)—O2 | (4-1-5-1) | 5% |
| 3-HHB(2F,3CL)—O2 | (4-1-9-1) | 5% |
| 3-H2Cro(7F,8F)-5 | (4-2-1-1) | 3% |
| 3-HB1OCro(7F,8F)-5 | (4-2-5-1) | 3% |

NI = 81.2° C.,
Tc ≦ −20° C.;
$\Delta n$ = 0.089;
$\eta$ = 27.5 mPa·s;
$\Delta\epsilon$ = −2.8;
Vth = 2.44 V,
$\tau$ = 10.6 ms;
VHR-1 = 99.1%;
VHR-2 = 98.4%;
VHR-3 = 98.1%.

Example 6

| | | |
|---|---|---|
| V—HEB(2F,3F)B(2F,3F)—O4 | (1-2-1) | 4% |
| V—HHEB(2F,3F)B(2F,3F)—O4 | (1-4-1) | 4% |
| V—DhHB(2F,3F)—O2 | (2-2-1) | 10% |
| 2-HH-3 | (3-1-1) | 17% |
| 3-HH—O1 | (3-1-1) | 10% |
| 7-HB-1 | (3-2-1) | 5% |
| 1V2—BB-1 | (3-3-1) | 5% |
| V—HHB-1 | (3-5-1) | 6% |
| 5-HB(F)BH-3 | (3-12-1) | 6% |
| 3-HB(2F,3F)—O2 | (4-1-1-1) | 5% |
| 3-HB(2F,3F)—O4 | (4-1-1-1) | 5% |
| 3-HBB(2F,3F)—O2 | (4-1-7-1) | 6% |
| 5-HBB(2F,3F)—O2 | (4-1-7-1) | 6% |
| 2-BB(2F,3F)B-3 | (4-1-8-1) | 5% |
| 3-HH1O(2F,3F,6Me)—O2 | (—) | 6% |

NI = 86.9° C.;
Tc ≦ −30° C.;
$\Delta n$ = 0.104;
$\eta$ = 26.4 mPa·s;
$\Delta\epsilon$ = −2.6;
Vth = 2.60 V;
$\tau$ = 9.8 ms;
VHR-1 = 99.1%;
VHR-2 = 98.4%;
VHR-3 = 98.1%.

Example 7

| | | |
|---|---|---|
| 3-HEB(2F,3F)B(2F,3F)—O4 | (1-2-1) | 3% |
| 5-HEB(2F,3F)B(2F,3F)—O2 | (1-2-1) | 4% |
| 3-HDhB(2F,3F)-1 | (2-3-1) | 9% |
| 2-HH-3 | (3-1-1) | 18% |
| V—HH-4 | (3-1-1) | 11% |
| 3-HHB-1 | (3-5-1) | 7% |
| 3-HHB-3 | (3-5-1) | 6% |
| 3-HB(2F,3F)—O2 | (4-1-1-1) | 6% |
| 5-HB(2F,3F)—O2 | (4-1-1-1) | 6% |
| 3-HHB(2F,3F)-1 | (4-1-4-1) | 9% |
| V2—HHB(2F,3F)-1 | (4-1-4-1) | 9% |
| 3-HH2Cro(7F,8F)-5 | (4-2-3-1) | 3% |
| 3-HH1OCro(7F,8F)-5 | (4-2-4-1) | 3% |
| 2O—B(2F,3F)B(2F,3F)—O6 | (—) | 3% |
| 4O—B(2F,3F)B(2F,3F)—O6 | (—) | 3% |

NI = 78.1° C.;
Tc ≦ −20° C.;
$\Delta n$ = 0.087;
$\eta$ = 28.4 mPa·s;
$\Delta\epsilon$ = −2.8;
Vth = 2.45 V;
$\tau$ = 10.8 ms;
VHR-1 = 99.2%;
VHR-2 = 98.3%;
VHR-3 = 98.1%.

Example 8

| | | |
|---|---|---|
| 5-H1OB(2F,3F)B(2F,3F)—O2 | (1-1-1) | 4% |
| 5-HEB(2F,3F)B(2F,3F)—O2 | (1-2-1) | 4% |
| 3-HH1OB(2F,3F)B(2F,3F)—O4 | (1-3-1) | 3% |
| 3-DhHB(2F,3F)—O2 | (2-2-1) | 5% |
| 3-Dh1OB(2F,3F)—O2 | (2) | 5% |
| V—HH-3 | (3-1-1) | 30% |
| 1V—HH-3 | (3-1-1) | 5% |
| 1-BB(F)B—2V | (3-7-1) | 4% |
| 1-B(F)BB—2V | (3-8-1) | 4% |
| 5-HBB(F)B—2 | (3-13-1) | 3% |
| 5-HBB(F)B—3 | (3-13-1) | 3% |
| 3-HB(2F,3F)—O2 | (4-1-1-1) | 5% |
| 5-HB(2F,3F)—O2 | (4-1-1-1) | 5% |
| 3-HHB(2F,3F)—O2 | (4-1-4-1) | 5% |
| 5-HHB(2F,3F)—O2 | (4-1-4-1) | 5% |
| 3-HH1OB(2F,3F)—O2 | (4-1-6-1) | 3% |

-continued

| | | |
|---|---|---|
| 3-HH1OB(2F,3CL)—O2 | (4-1-12-1) | 3% |
| 1O1—HBBH-4 | (—) | 4% |

NI = 104.3° C.;
Tc ≦ −30° C.;
Δn = 0.109;
η = 27.6 mPa · s;
Δε = −2.8;
Vth = 2.47 V;
τ = 10.5 ms;
VHR-1 = 99.1%;
VHR-2 = 98.4%;
VHR-3 = 98.1%.

Example 9

| | | |
|---|---|---|
| 3-HEB(2F,3F)B(2F,3F)—O2 | (1-2-1) | 5% |
| 5-HEB(2F,3F)B(2F,3F)—O2 | (1-2-1) | 5% |
| 3-HHEB(2F,3F)B(2F,3F)—O2 | (1-4-1) | 5% |
| 5-HHEB(2F,3F)B(2F,3F)—O2 | (1-4-1) | 5% |
| 3-DhHB(2F,3F)—O2 | (2-2-1) | 8% |
| 3-HDhB(2F,3F)—O2 | (2-3-1) | 8% |
| 2-HH-3 | (3-1-1) | 20% |
| 3-HH-5 | (3-1-1) | 18% |
| 5-HB—O2 | (3-2-1) | 8% |
| V—HHB-1 | (3-5-1) | 5% |
| V2—HHB-1 | (3-5-1) | 5% |
| 5-B(F)BB-2 | (3-8-1) | 4% |
| 5-B(F)BB-3 | (3-8-1) | 4% |

NI = 104.0° C.;
Tc ≦ −30° C.;
Δn = 0.100;
η = 28.1 mPa · s;
Δε = −2.4;
Vth = 2.77 V;
τ = 10.8 ms;
VHR-1 = 99.2%;
VHR-2 = 98.3%;
VHR-3 = 98.1%.

The compositions in Examples 1 to 9 had a smaller bulk viscosity and shorter response time than those in Comparative example 1. Thus, the liquid crystal composition of the invention has superior characteristics to those described in Comparative Examples 1.

INDUSTRIAL APPLICABILITY

Invention provides the liquid crystal composition that satisfies at least one of characteristics such as a high maximum temperature of the nematic phase, a low minimum temperature of the nematic phase, a small viscosity, a large optical anisotropy, a large dielectric anisotropy, a large specific resistance, a high stability to ultraviolet light, a high stability to heat, or that is suitably balanced regarding at least two of the characteristics. Since a liquid crystal display device that contains this composition has a short response time, a large voltage holding ratio, a large contrast ratio, a long life time, it is suitable for an AM device or the like.

What is claimed is:

1. A liquid crystal composition having a negatively dielectric anisotropy containing at least one compound selected from the group of compounds represented by formula (1) as the first component, and at least one compound selected from the group of compounds represented by formula (2) as the second component:

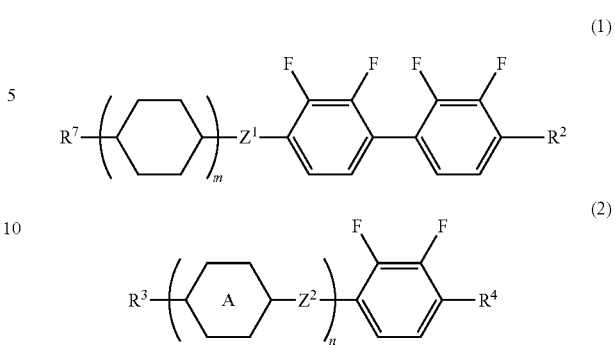

wherein $R^1$, $R^2$, $R^3$ and $R^4$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring A is independently 1,4-cyclohexylene or 1,4-phenylene in which arbitrary hydrogen is replaced by fluorine or chlorine, or tetrahydropyran-2,5-diyl; at least one ring A is tetrahydropyran-2,5-diyl; $Z^1$ is independently methyleneoxy or carbonyloxy; $Z^2$ is independently a single bond, ethylene, methyleneoxy or carbonyloxy; m is 1 or 2; n is 1, 2 or 3.

2. The liquid crystal composition according to claim 1, wherein the first component is at least one compound selected from the group of compounds represented by formula (1-1) to formula (1-4):

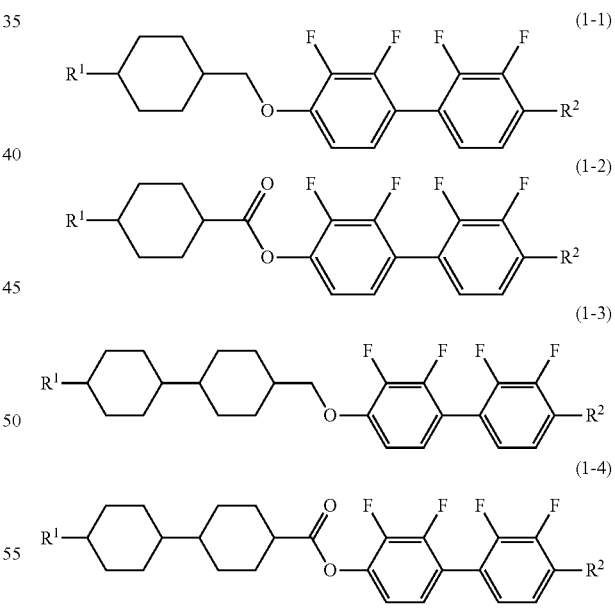

wherein $R^1$ and $R^2$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

3. The liquid crystal composition according to claim 1, wherein the second component is at least one compound selected from the group of compounds represented by formula (2-1) to (2-4):

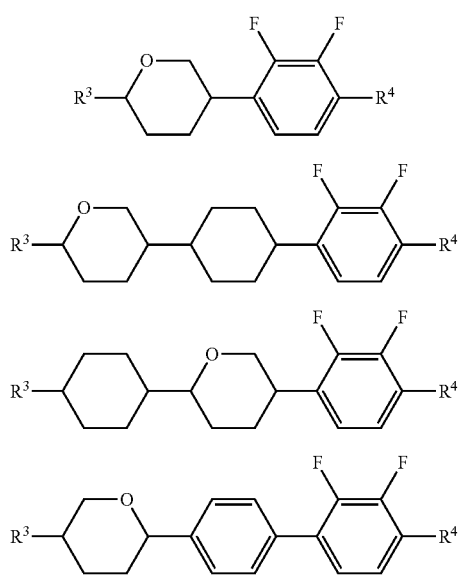

(2-1)

(2-2)

(2-3)

(2-4)

wherein $R^3$ and $R^4$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

4. The liquid crystal composition according to claim 1, wherein the ratio of the first component is in the range of approximately 5% by weight to approximately 60% by weight, and the ratio of the second component is in the range of approximately 5% by weight to approximately 40% by weight based on the total weight of the liquid crystal composition.

5. The liquid crystal composition according to claim 1, wherein the third component contains at least one compound selected from the group of compounds represented by formula (3):

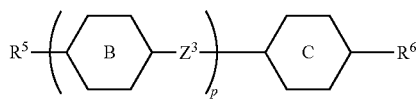

(3)

wherein $R^5$ and $R^6$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring B and ring C are each independently 1,4-cyclohexylene, 1,4-phenylene, 2-fluoro-1,4-phenylene, or 3-fluoro-1,4-phenylene; $Z^3$ is independently a single bond, ethylene, methyleneoxy or carbonyloxy; and p is 1, 2 or 3.

6. The liquid crystal composition according to claim 5, wherein the third component is at least one compound selected from the group of compounds represented by formula (3-1) to formula (3-13):

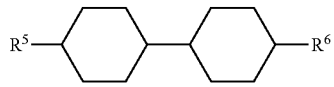

(3-1)

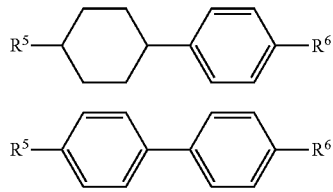

(3-2)

(3-3)

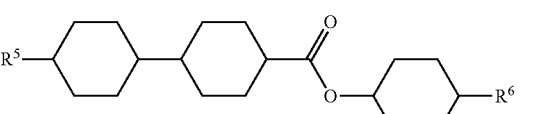

(3-4)

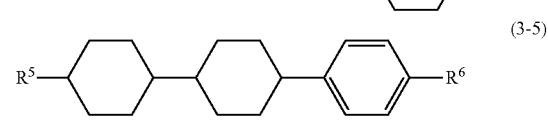

(3-5)

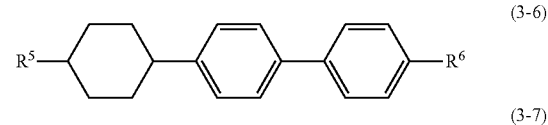

(3-6)

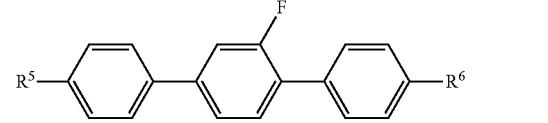

(3-7)

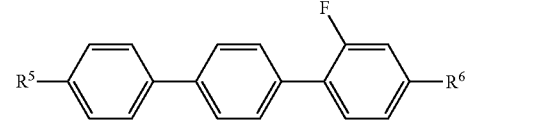

(3-8)

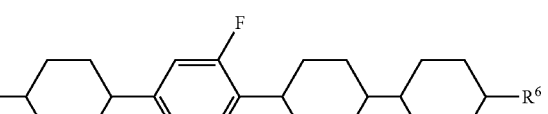

(3-9)

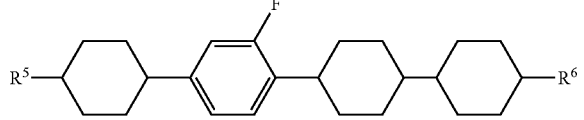

(3-10)

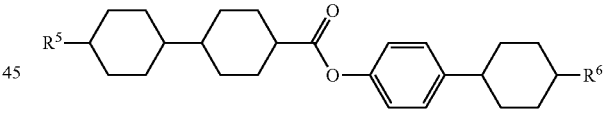

(3-11)

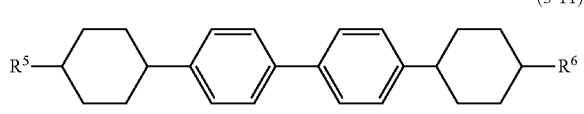

(3-12)

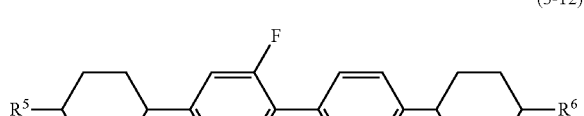

(3-13)

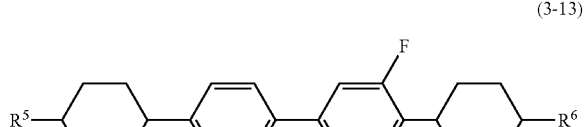

wherein $R^5$ and $R^6$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

7. The liquid crystal composition according to claim 5, wherein the ratio of the third component is in the range of approximately 30% to approximately 75% by weight based on the total weight of the liquid crystal composition.

8. The liquid crystal composition according to claim 1, wherein the fourth component further contains at least one compound selected from the group of compounds represented by formula (4-1) to formula (4-2):

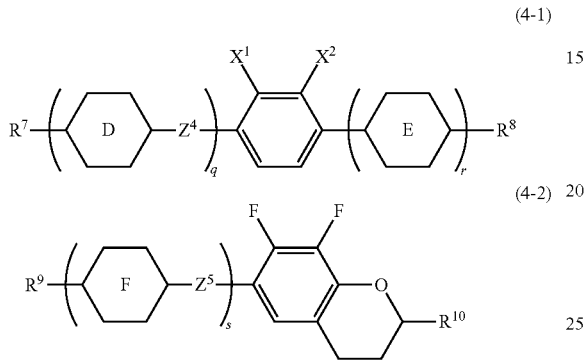

wherein $R^7$, $R^8$, $R^9$ and $R^{10}$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring D, ring E and ring F are each independently 1,4-cyclohexylene or 1,4-phenylene; $Z^4$ and $Z^5$ are independently a single bond, ethylene, methyleneoxy or carbonyloxy; $X^1$ and $X^2$ are independently fluorine or chlorine; and q and r are 0, 1, 2 or 3, the sum of q and r is 3 or less; s is 1, 2 or 3.

9. The liquid crystal composition according to claim 5, wherein the fourth component further contains at least one compound selected from the group of compounds represented by formula (4-1) to formula (4-2):

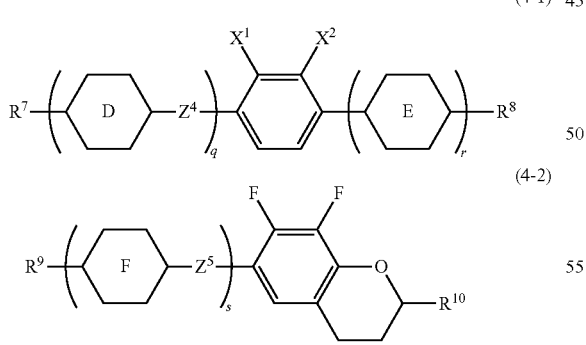

wherein $R^7$, $R^8$, $R^9$ and $R^{10}$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring D, ring E and ring F are each independently 1,4-cyclohexylene or 1,4-phenylene; $Z^4$ and $Z^5$ are independently a single bond, ethylene, methyleneoxy or carbonyloxy; $X^1$ and $X^2$ are each independently fluorine or chlorine; and q and r are each independently 0, 1, 2 or 3, the sum of q and r is 3 or less; s is 1, 2 or 3.

10. The liquid crystal composition according to claim 8, wherein the fourth component is at least one compound selected from the group of compounds represented by formula (4-1-1) to (4-1-12) and (4-2-1) to (4-2-5):

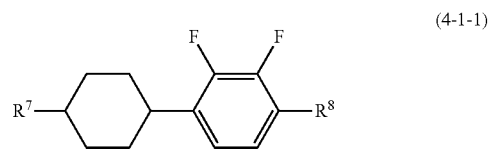

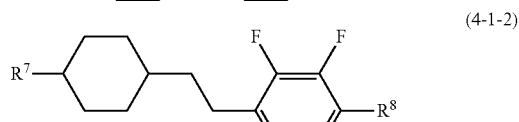

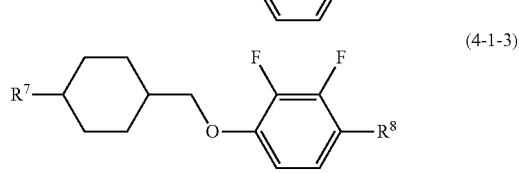

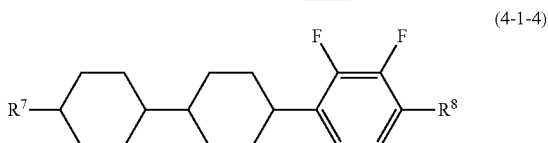

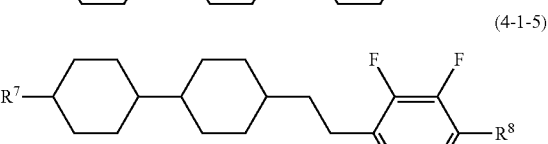

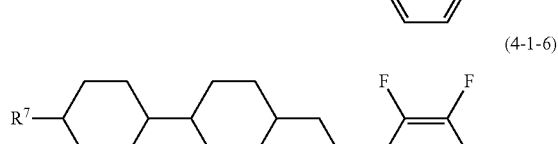

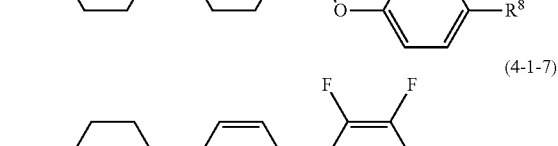

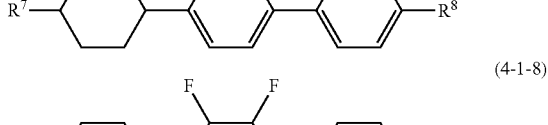

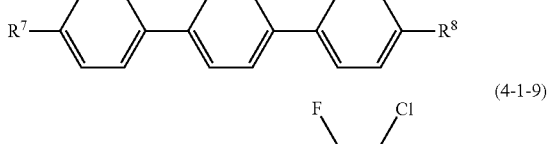

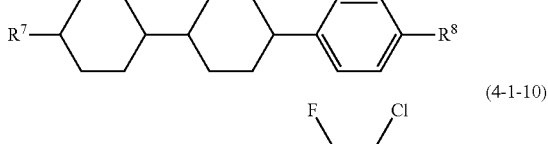

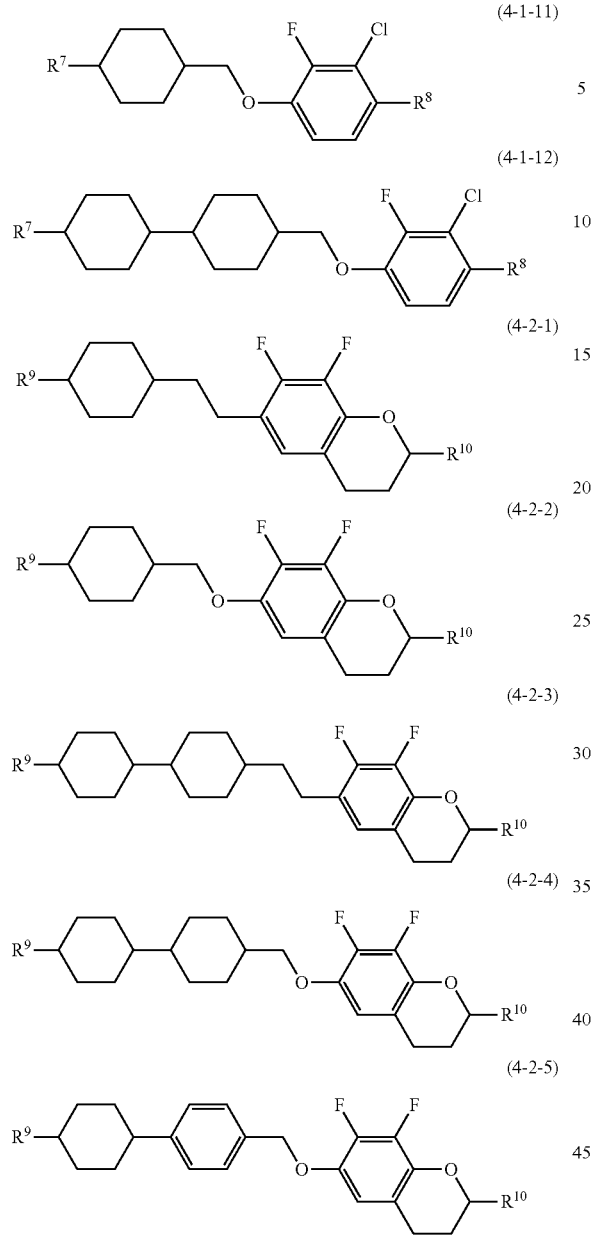
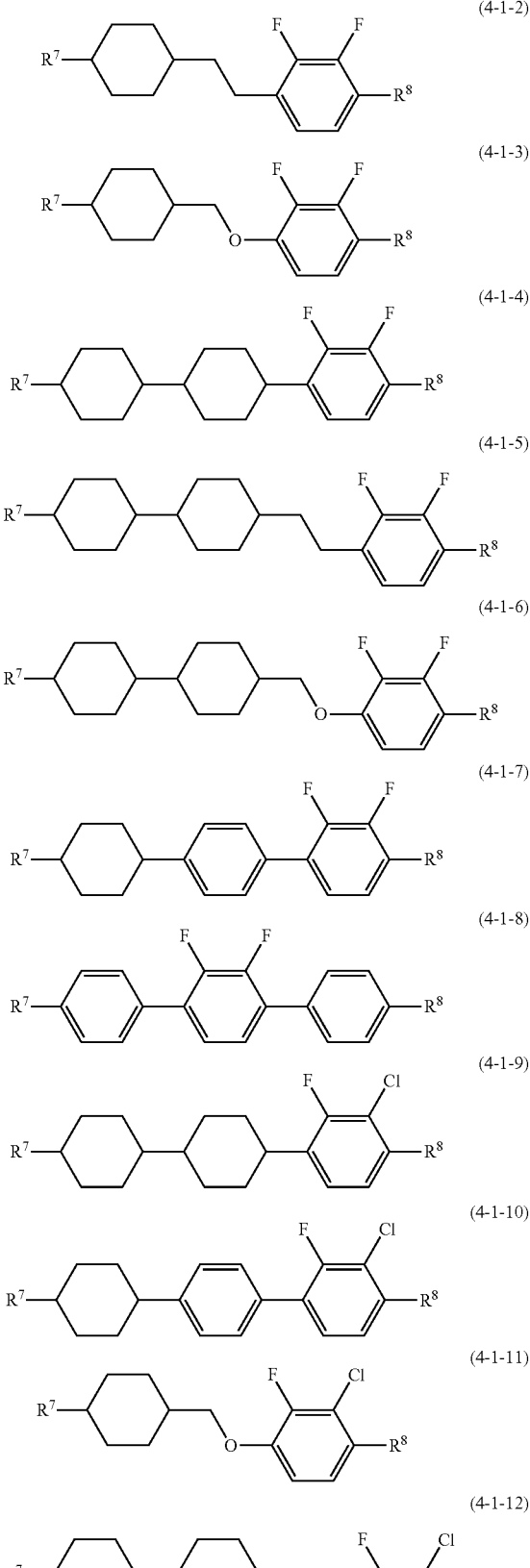

wherein $R^7$, $R^8$, $R^9$ and $R^{10}$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

11. The liquid crystal composition according to claim 9, wherein the fourth component is at least one compound selected from the group of compounds represented by formula (4-1-1) to (4-1-12) and (4-2-1) to (4-2-5):

(4-2-1)
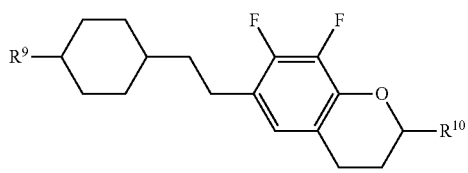

(4-2-2)
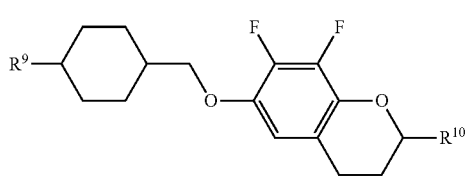

(4-2-3)
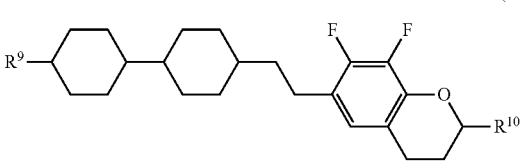

(4-2-4)
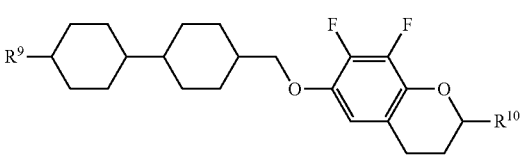

(4-2-5)
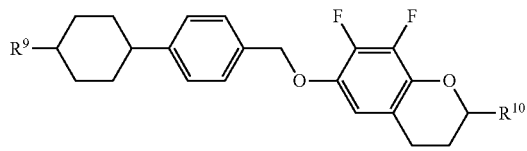

wherein $R^7$, $R^8$, $R^9$ and $R^{10}$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

12. The liquid crystal composition according to claim 8, wherein the ratio of the fourth component is in the range of approximately 15% to approximately 50% by weight based on the total weight of the liquid crystal composition.

13. The liquid crystal composition according to claim 9, wherein the ratio of the fourth component is in the range of approximately 15% to approximately 50% by weight based on the total weight of the liquid crystal composition.

14. The liquid crystal composition according to claim 1, wherein the maximum temperature of the nematic phase is approximately 70° C. or higher, the optical anisotropy (25° C.) at a wavelength of 589 nm is approximately 0.08 or more, and the dielectric anisotropy (25° C.) at a frequency of 1 kHz is approximately −2 or less.

15. A liquid crystal display device containing the liquid crystal composition according to claim 1.

16. The liquid crystal display device according to claim 15, wherein an operating mode of the liquid crystal display device is a VA mode, an IPS mode or a PSA mode, and a driving mode of the liquid crystal display device is an active matrix mode.

\* \* \* \* \*